US009465384B1

(12) United States Patent
Jain et al.

(10) Patent No.: US 9,465,384 B1
(45) Date of Patent: Oct. 11, 2016

(54) METHODS AND SYSTEMS FOR TIERED PROGRAMMING OF ROBOTIC DEVICE

(71) Applicant: REDWOOD ROBOTICS, INC., San Francisco, CA (US)

(72) Inventors: Advait Jain, San Francisco, CA (US); Anthony Jules, Oakland, CA (US); Aaron Edsinger, San Francisco, CA (US)

(73) Assignee: Redwood Robotics, Inc., San Fransisco, CA (US)

( * ) Notice: Subject to any disclaimer, the term of this patent is extended or adjusted under 35 U.S.C. 154(b) by 0 days.

(21) Appl. No.: 14/311,799

(22) Filed: Jun. 23, 2014

Related U.S. Application Data

(60) Provisional application No. 61/838,707, filed on Jun. 24, 2013.

(51) Int. Cl.
| | |
|---|---|
| G05B 19/418 | (2006.01) |
| G06Q 10/06 | (2012.01) |
| G05B 19/042 | (2006.01) |
| B25J 9/16 | (2006.01) |

(52) U.S. Cl.
CPC ............ G05B 19/41865 (2013.01); B25J 9/16 (2013.01); B25J 9/1656 (2013.01); B25J 9/1661 (2013.01); G05B 19/0426 (2013.01); G06Q 10/06311 (2013.01); G06Q 10/06316 (2013.01)

(58) Field of Classification Search
CPC .... B25J 9/1656; B25J 9/1661; B25J 9/1658; B25J 9/16; B25J 9/1692; G05B 19/41865; G05B 19/409; G05B 2219/23126; G05B 2219/23254; G05B 2219/23261; G05B 2219/23291; G05B 2219/23293; G01N 35/0099; G06Q 10/06311; G06Q 10/06316; G06Q 10/36137; G06Q 10/36153
See application file for complete search history.

(56) References Cited

U.S. PATENT DOCUMENTS

| | | | | |
|---|---|---|---|---|
| 6,622,083 | B1* | 9/2003 | Knockeart | G01C 21/362 701/420 |
| 6,826,452 | B1* | 11/2004 | Holland | B66C 1/663 318/566 |
| 7,729,801 | B2* | 6/2010 | Abramson | A01D 34/008 320/107 |
| 2002/0094257 | A1* | 7/2002 | Babbs | B65G 1/045 414/277 |
| 2005/0245272 | A1* | 11/2005 | Spaur | H04L 12/4625 455/456.3 |
| 2006/0111812 | A1* | 5/2006 | Okamoto | B25J 5/007 700/214 |
| 2006/0149418 | A1* | 7/2006 | Anvari | A61G 13/10 700/245 |
| 2006/0178778 | A1* | 8/2006 | Fuhlbrigge | B25J 9/1656 700/264 |
| 2010/0312387 | A1* | 12/2010 | Jang | G05B 19/41865 700/248 |
| 2011/0153079 | A1* | 6/2011 | Jung | G05B 19/41865 700/248 |
| 2012/0071794 | A1* | 3/2012 | Karni | A61B 19/2203 601/2 |
| 2012/0072019 | A1* | 3/2012 | Sanders | B65J 9/1682 700/245 |

* cited by examiner

*Primary Examiner* — Abby Lin
(74) *Attorney, Agent, or Firm* — McDonnell Boehnen Hulbert & Berghoff LLP

(57) ABSTRACT

A method operable by a computing device is provided. The method may include receiving a request for a given task to be performed by a robotic system. The method may also determining one or more subtasks required to perform the given task, where the one or more subtasks include one or more parameters used to define the one or more subtasks. The method may also include determining an arrangement of the one or more subtasks to perform the given task, and providing for display an indication of the one or more undefined parameters for the given task. The method may also include receiving an input defining the one or more undefined parameters for the given task, and executing the one or more subtasks in the determined arrangement and in accordance with the one or more defined parameters to cause the robotic system to perform the given task.

15 Claims, 20 Drawing Sheets

METHODS AND SYSTEMS FOR TIERED PROGRAMMING OF ROBOTIC DEVICE

CROSS-REFERENCE TO RELATED APPLICATION

The present application claims priority to U.S. Patent Application Ser. No. 61/838,707, filed on Jun. 24, 2013, the entire contents of which are herein incorporated by reference.

BACKGROUND

Unless otherwise indicated herein, the materials described in this section are not prior art to the claims in this application and are not admitted to be prior art by inclusion in this section.

Programming a robot to perform a task is traditionally done by highly trained professionals in the computer science research or automation field. The main paradigms for describing a given task involve description of the position and orientation of robot peripherals, and the forces acting on or exerted by the robot. Usually, a technician integrates these peripherals to create a custom robotic system to solve a specific task. This integration effort includes mechanically installing robot peripherals into the robotic system, wiring these devices together, describing their configuration within an automation controller, and then calibrating a geometric location of these devices relative to each other and to the world.

This integration process can be time consuming and expensive. If it is desired to modify the functionality of the robotic system, much of this integration effort is repeated. In addition, robotic systems often may not be able to be reconfigured since the systems are usually customized for a specific task or requirement. A high cost of modification may also make it undesirable to swap out older or damaged devices.

SUMMARY

In one example, a method operable by a computing device is provided. The method may include receiving a request for a given task to be performed by a robotic system. The method may also include determining one or more subtasks required to perform the given task. The one or more subtasks may include one or more parameters used to define the one or more subtasks, and the one or more parameters may include information required for the robotic system to execute a given subtask. At least one of the one or more parameters may be undefined such that the one or more undefined parameters prevent the robotic system from executing a corresponding subtask. The method may also include determining an arrangement of the one or more subtasks to perform the given task, where the arrangement includes a combination of the one or more subtasks in a particular order. The method may also include providing for display an indication of the one or more undefined parameters for the given task after determining the arrangement of the one or more subtasks. The method may also include receiving an input defining the one or more undefined parameters for the given task, where a defined parameter includes information required for the robotic system to execute a given subtask. The method may also include executing the one or more subtasks in the determined arrangement and in accordance with the one or more defined parameters to cause the robotic system to perform the given task.

In another example, a computing device is provided. The computing device may include one or more processors, and a computer-readable medium, configured to store instructions, that when executed by the one or more processors, cause the computing device to perform functions. The functions may include receiving a request for a given task to be performed by a robotic system. The functions may also include determining one or more subtasks required to perform the given task. The one or more subtasks may include one or more parameters used to define the one or more subtasks, and the one or more parameters may include information required for the robotic system to execute a given subtask. At least one of the one or more parameters may be undefined such that the one or more undefined parameters prevent the robotic system from executing a corresponding subtask. The functions may also include determining an arrangement of the one or more subtasks to perform the given task, where the arrangement includes a combination of the one or more subtasks in a particular order. The functions may also include providing for display an indication of the one or more undefined parameters for the given task after determining the arrangement of the one or more subtasks. The functions may also include receiving an input defining the one or more undefined parameters for the given task, where a defined parameter includes information required for the robotic system to execute a given subtask. The functions may also include executing the one or more subtasks in the determined arrangement and in accordance with the one or more defined parameters to cause the robotic system to perform the given task.

In another example, a system is provided. The system may include a modular reconfigurable workcell, and a computer-based controller in communication with the modular reconfigurable workcell. The computer based controller may be configured to perform functions. The functions may include receiving a request to be performed by one or more peripherals of the modular reconfigurable workcell. The functions may also include determining one or more subtasks required to perform the given task. The one or more subtasks may include one or more parameters used to define the one or more subtasks, and the one or more parameters may include information required for the robotic system to execute a given subtask. At least one of the one or more parameters may be undefined such that the one or more undefined parameters prevent the robotic system from executing a corresponding subtask. The functions may also include determining an arrangement of the one or more subtasks to perform the given task, where the arrangement includes a combination of the one or more subtasks in a particular order. The functions may also include providing for display an indication of the one or more undefined parameters for the given task after determining the arrangement of the one or more subtasks. The functions may also include receiving an input defining the one or more undefined parameters for the given task, where a defined parameter includes information required for the robotic system to execute a given subtask. The functions may also include executing the one or more subtasks in the determined arrangement and in accordance with the one or more defined parameters to cause the one or more peripherals of the modular reconfigurable workcell to perform the given task.

These as well as other aspects, advantages, and alternatives, will become apparent to those of ordinary skill in the art by reading the following detailed description, with reference where appropriate to the accompanying figures.

DETAILED DESCRIPTION

Figure 1:
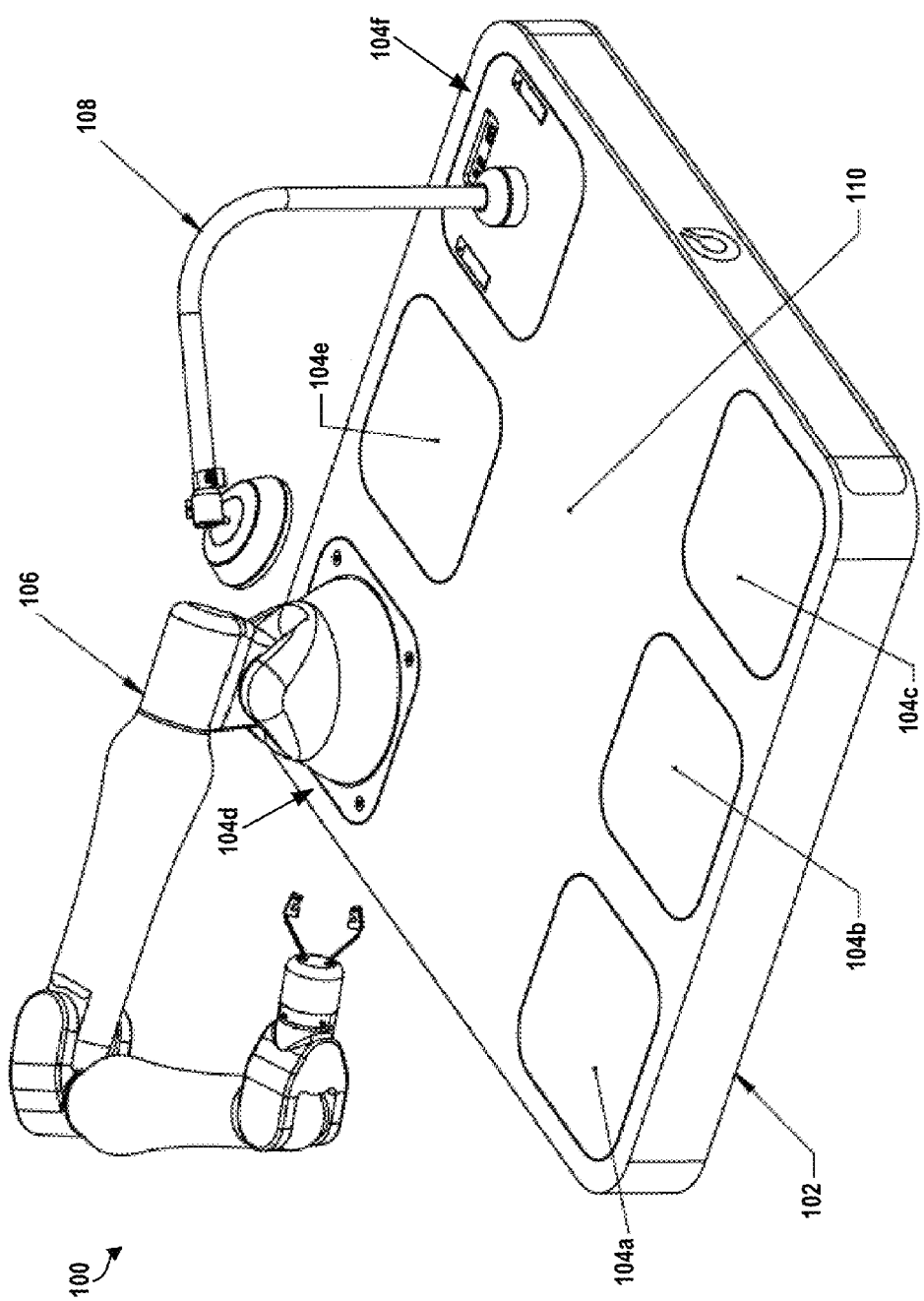
FIG. 1 illustrates an example modular reconfigurable workcell.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Within examples, a tiered programming model for programming robotic systems to perform various tasks is provided. A given task may be broken down into one or more subtasks, that when executed by the robotic system in a particular order, complete the given task. The subtasks include one or more parameters used to define the subtasks. The one or more parameters include information required for the robotic system to execute a given subtask. These parameters may be defined during composition of the subtasks, or at deployment of the robotic system. Once all parameters of the subtasks are defined, the robotic system can execute a given task by completing each of the subtasks in a particular order.

In some examples, the robotic system may include a reconfigurable workcell that includes an enclosure that houses one or more modular docking stations. The enclosure may be sealed to an exterior environment, and able to rigidly support working forces exerted by an attached robot arm or other peripheral. The enclosure may be configured to be mounted to any surface including a worktable, floor, wall, or ceiling, for example. The enclosure includes computer and power requirements, and related devices needed for workcell functionality, and may utilize the surface of the enclosure as a work surface for a specific task.

In some examples, one or more modular docking stations are exposed on a top surface of the enclosure that support plug-and-play attachment of robot peripherals and may enable a tool-less quick connect such that the peripheral can be attached with no tools. The modular docking stations include features to prevent installation of the peripheral at an incorrect orientation, and features to ensure repeatable and precise alignment of the peripheral to the enclosure. The modular docking stations also may include features that allow for electrical connection of one or more power and communication busses to the attached peripheral without use of tools or manual electrical connectors.

The modular workcell may also include a computing device positioned inside of the enclosure, or exterior to the enclosure and in communication with components of the workcell. The computing device may provide a wired or wireless client interface that enables a user to provide input to the workcell and visualize the workcell from a tablet, mobile phone, or other computing device. Further, the computing device may include a task verification and deployment system that informs a user if a desired task can be performed, and generates a procedure to interactively guide the user to correctly configure the workcell.

Referring now to the figures, FIG. 1 illustrates an example modular reconfigurable workcell 100 that may be used to perform tasks. The workcell 100 includes an enclosure 102 with six modular docking bays 104a-f arranged in a 2×3 array. The modular docking bays 104a-f are on a surface of the enclosure 102 and support attachment of one or more docking modules in a fixed geometric configuration. The modular docking bays 104a-f include a plurality of electrical connections for a variety of power and communication busses of the docking modules to be attached, and the docking modules provide an electrical and mechanical interface between a respective peripheral and the workcell 100. As shown in FIG. 1, two modular docking bays 104d and 104f include docking modules inserted and configured with two peripheral modules that include a robot arm peripheral 106 and a camera peripheral 108, although any variety and configuration of peripherals may be achieved. Other example peripherals include a fixture for locating a device-under-assembly, and a measurement tool for measuring a device-under-inspection. In addition, other numbers and arrangements of docking stations may be chosen.

Each modular docking bay 104a-f is a location that a peripheral module can be inserted. A top of the enclosure 102 may include areas without docking stations, providing a work surface 110 for automation tasks. Because the work surface 110 is on the enclosure itself, a location of a work object and calibration may be achieved. Inclusion of areas without docking bays also creates volume inside of the enclosure 102 that is not occupied with docking bay hardware. This volume may be used for internal subsystems, such as a computing device, as an example.

As shown in FIG. 1, modular docking bays that do not have docking modules inserted, such as the modular docking bays 104a, 104b, 104c and 104e, may each include a cover installed to seal the docking bays if a peripheral is not present.

Figure 2A:
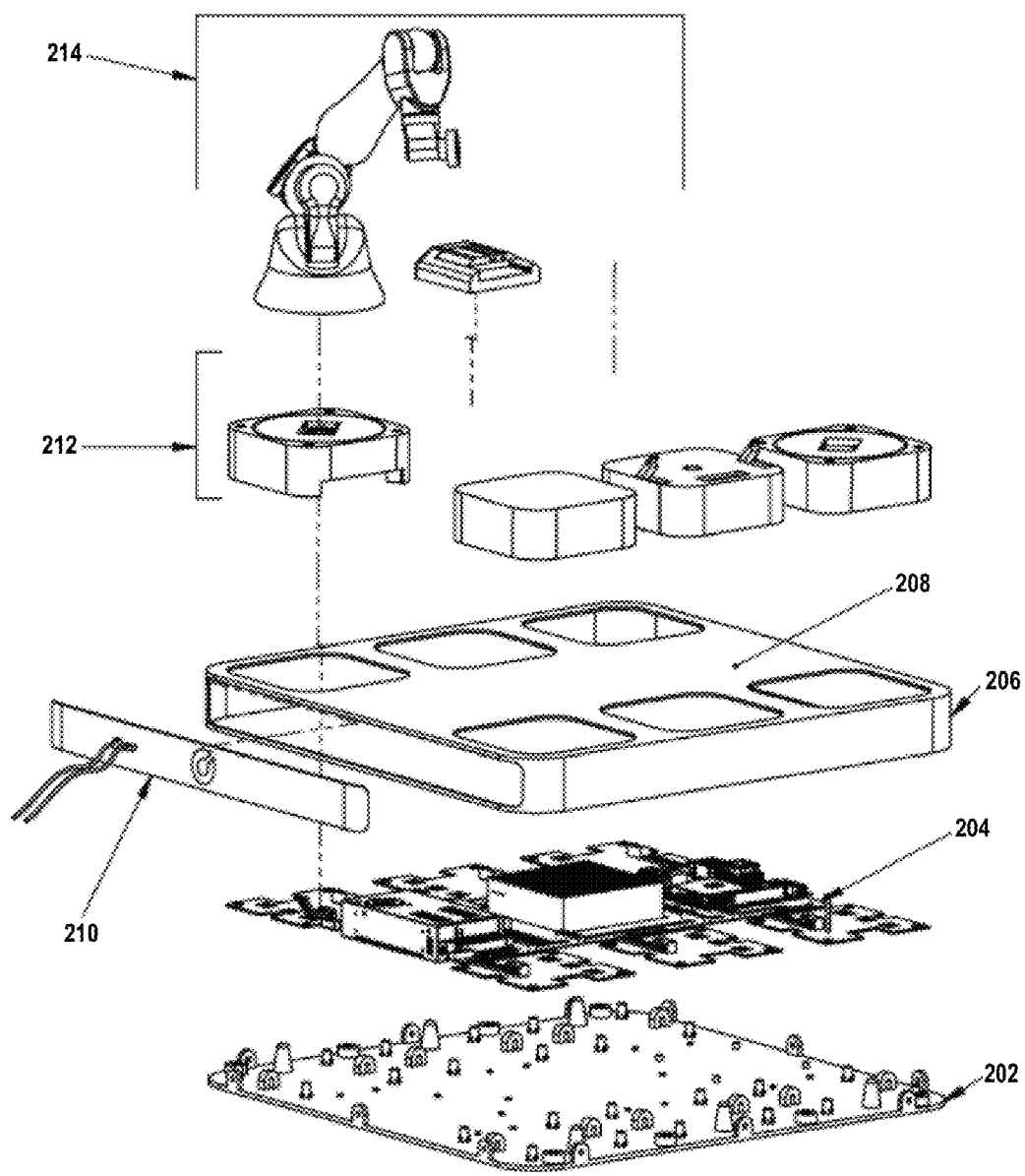
FIG. 2A illustrates an exploded view showing an example of an internal structure of an enclosure.

FIG. 2A illustrates an exploded view showing an example of an internal structure of an enclosure. The enclosure includes a bottom plate 202 that may include features for mechanically attaching peripherals. The bottom plate 202 may act as a structural element, allowing a mechanically attached peripheral to pass a load to a mounting surface of the enclosure. The bottom plate 202 may also provide features for mounting an electrical subsystem or backplane 204. The backplane 204 electrical subsystem may include computers, power supplies, and electronics that interface attached peripherals to the computers. The backplane 204 may couple communication busses between modular docking bays and provide power circuitry to the modular docking bays. The backplane 204 may be considered an electrical subsystem and may comprise or be a wire harness.

The enclosure also includes side plates 206 and a top plate 208 which form the enclosure when attached to the bottom plate 202. The enclosure may be sealed to prevent ingress of unwanted dust, liquid, or other environmental elements. The top plate 208 has identical holes cut into the top plate 208 to accommodate each docking bay.

A back panel 210 provides electrical connections for power and communication between the backplane electrical subsystem 204 and an external source. Docking modules, such as docking module 212, may be inserted into each docking bay. The docking module 212 provides an electrical and mechanical interface for integrating a wide variety of peripherals, such as the robot arm 214 to the enclosure.

Figure 2B:
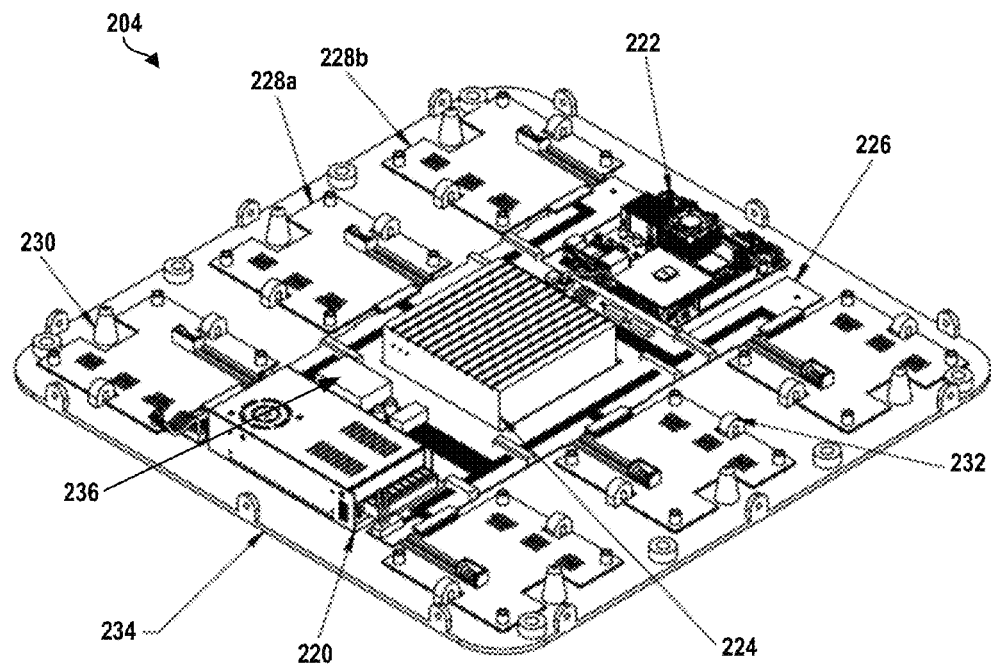
FIG. 2B illustrates an example backplane with attached subsystems.

FIG. 2B illustrates an example backplane electrical subsystem 204 with attached subsystems. The subsystems provide functionality required for the workcell. The subsystems may include a power supply 220, a control processor 222 for handling real-time control of robot arm peripherals, a task processor 224 for handling non real-time tasks, and a central backplane printed circuit board (PCB) 226 that provides electrical interconnects between one or more dock station PCBs 228a-b and the processors 222 and 224.

The backplane PCB 226 may include functionality for multiplexing communication busses, bus hubs or switches, power management circuitry, or computational resources. Each modular docking bay has an identical form factor. The dock station PCBs 228a-b may attach to the backplane PCB 226 by card edge connectors, by a wire harness, or by being part of the backplane itself. The backplane 204 may further include features for attachment and registration of docking modules. One or more tapered posts 230, latch hooks 232, or threaded extrusion features can act as a mechanical interface between a bottom plate 234 of the backplane 204 and a docking module, for example.

The backplane 204 may further include an inertial measurement unit (IMU) 236 to determine an acceleration experienced by the workcell, for example. The IMU 236 may monitor for abnormal accelerations imparted to the backplane 204. Abnormal accelerations can be an indication of a malfunctioning arm peripheral or unexpected contact with a person or other machinery. In some examples, upon detection of an abnormal acceleration, the workcell can operate in a safety fault mode. In addition, the IMU 236 can provide an orientation of the backplane 204 with respect to gravity. Some peripherals, such as a robot arm, can benefit from knowledge of a gravity vector to accomplish gravity compensation based control. The IMU 236 may output the control processor 236, which may receive the acceleration and determine an indication of a malfunctioning peripheral or contact of a peripheral with another element.

Figure 2C:
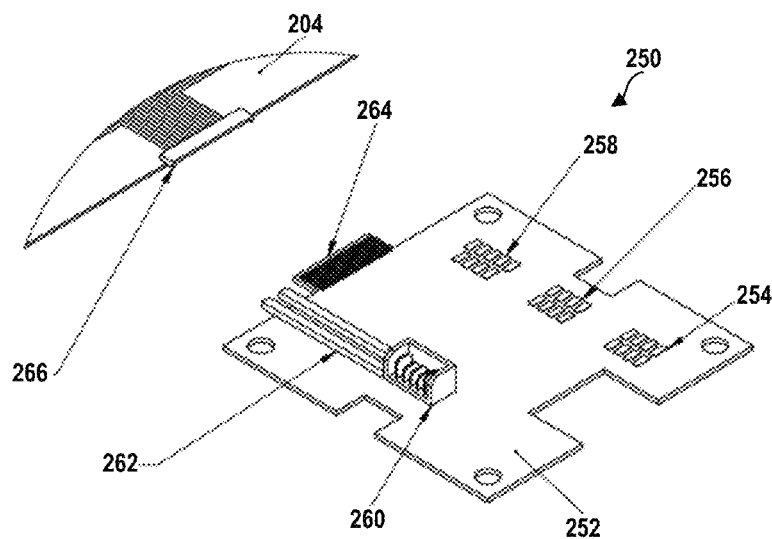
FIG. 2C illustrates an example docking station PCB that interfaces electrical signals from the backplane to a docking module.

FIG. 2C illustrates an example docking station PCB 250 that interfaces electrical signals from the backplane 204 to a docking module. The docking station PCB 250 includes a PCB 252 with one or more locations for quick electrical connect receptacles 254, 256, 258, and 260 placed such as to make an electrical connection to a corresponding connector on a docking module when a peripheral is inserted. The receptacles may be exposed foil pads, such as receptacles 254, 256, and 258, blade connectors, such as receptacles 260, or related spring electrical quick connect features. The docking station PCB 250 includes registration features to ensure precise and repeatable installation inside the enclosure. The docking station PCB 250 may include power bus bars 262 for a power bus. A PCB edge connector 264 may be employed to connect the docking station PCB 250 to a corresponding connector 266 on the central backplane PCB 204.

Figure 2D:
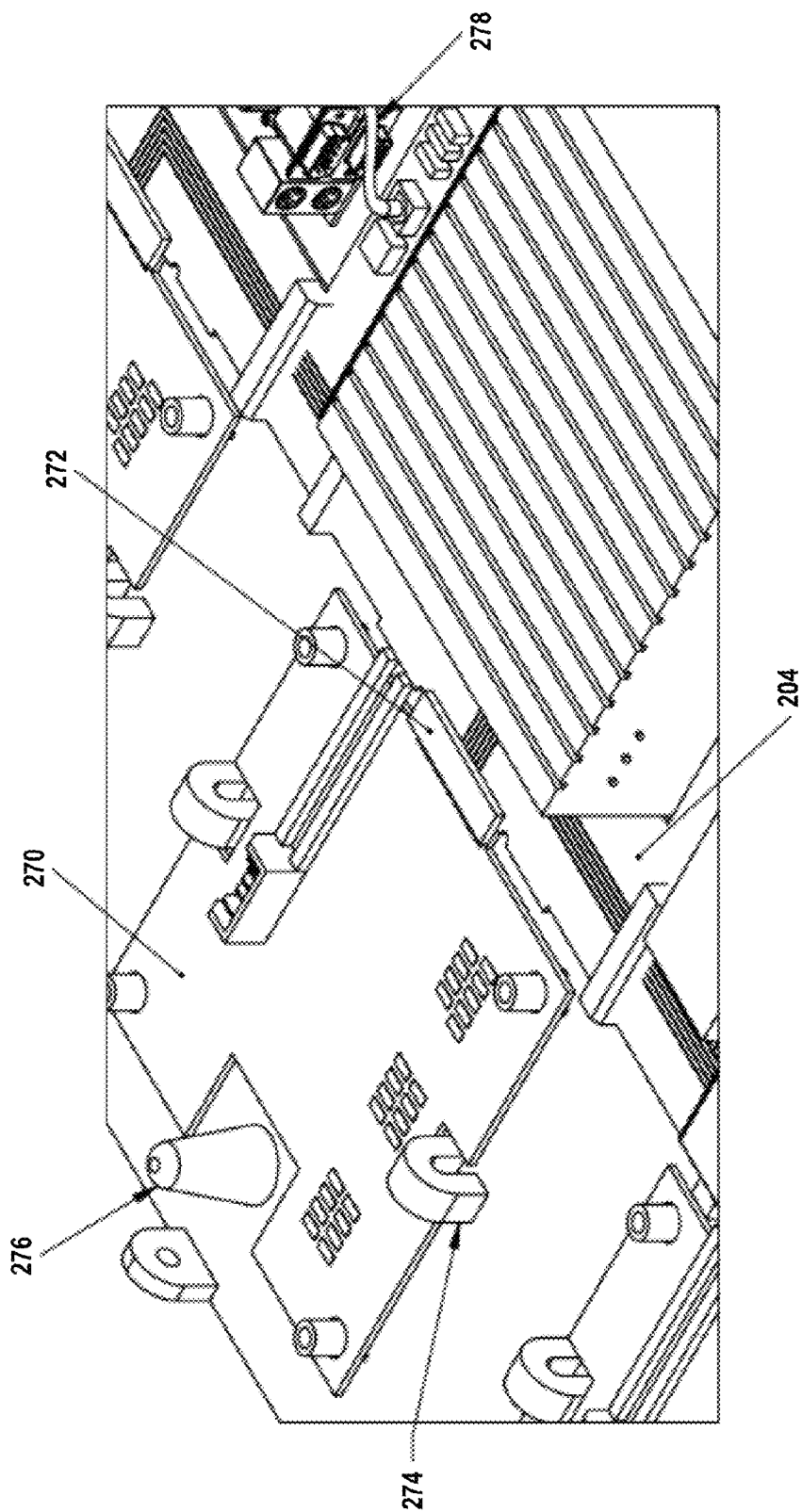
FIG. 2D illustrates a detailed view of a dock station PCB installed in the enclosure.

FIG. 2D illustrates a detailed view of a dock station PCB 270 installed in the enclosure. The dock station PCB 270 includes a card edge connector 272 attaching to the central backplane PCB 204. Also shown are mechanically connection hooks 274 and a tapered post 276 to ensure alignment during peripheral installation. The backplane PCB 204 may also provide power and communications to attached computers 278.

Thus, as shown in FIGS. 2A-2D, the workcell includes a processor in the enclosure, and one or more modular docking bays couple to one or more docking modules through the backplane and via a printed circuit board (PCB) card edge connector or a wire harness. The modular docking bays include a variety of electrical connections, such as Ethernet, Firewire, CANBUS, and USB connections, to couple to the docking modules. The enclosure further includes a power supply and a central backplane circuitry board that provides electrical interconnects between the one or more docking modules and the power supply and between the one or more docking modules and the processor. The enclosure all the one or more modular docking bays to be accessible through a surface of the workcell, and may be sealed to an outside environment.

Within examples, the workcell shown in FIGS. 2A-2D enables co-locating a peripheral with a power and control system in one enclosure to avoid a need for a connection wiring harness.

Figure 3:
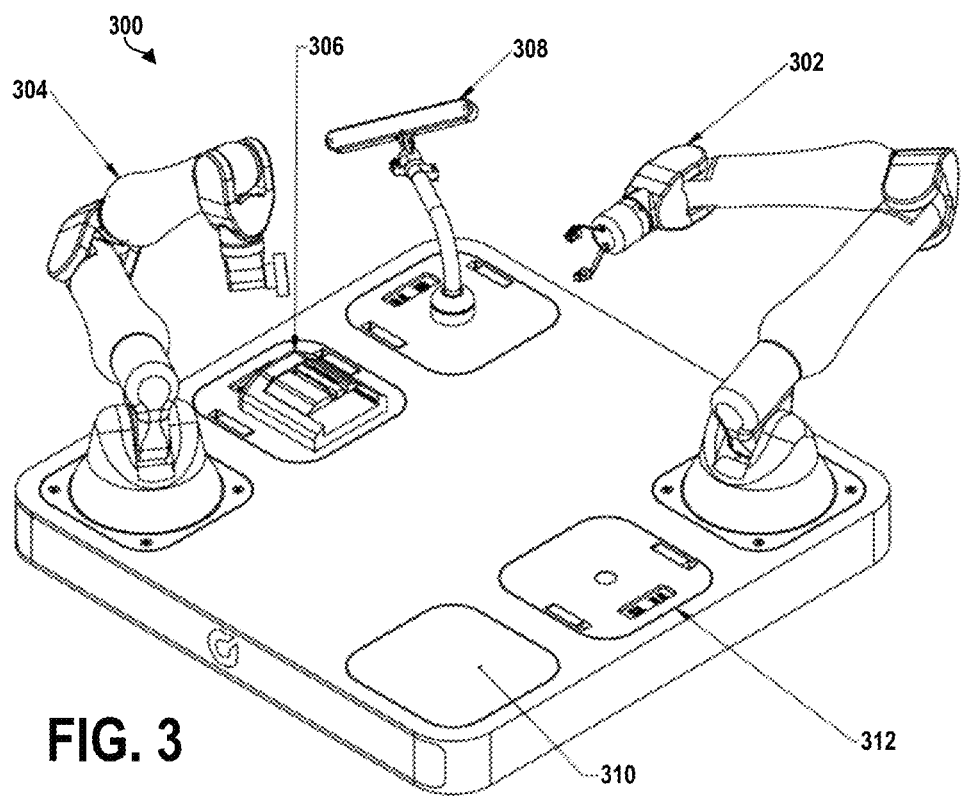
FIG. 3 illustrates an example modular reconfigurable workcell.

FIG. 3 illustrates an example modular reconfigurable workcell 300. The workcell 300 includes different peripherals installed in each docking bay including a seven degree of freedom (DOF) arm peripheral with gripper 302, a seven DOF arm peripheral with camera 304, a test device peripheral for assessing device-under-test functionality 306, a 3D sensor peripheral for measuring a location of a device-under-assembly 308, a docking bay cover 310, and an expansion input/output (I/O) peripheral 312 for interfacing to external devices such as test machines, PLCs, and safety guards. Any of the peripherals may be inserted within any docking bays and configured as desired for a specific application or task. Within examples, each modular docking bay is identical, and docking bays without inserted docking modules and peripherals may include the cover 310 cover secured over the modular docking bay to provide a uniform working surface and protect the electrical subsystem.

Figure 4:
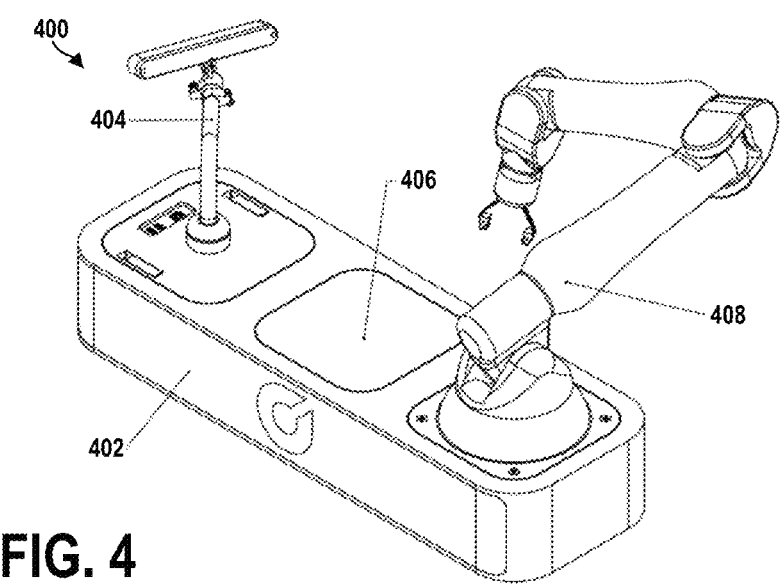
FIG. 4 illustrates another example modular reconfigurable workcell.

FIG. 4 illustrates an example modular reconfigurable workcell 400. The workcell is configured to include a 1×3 array of docking bays. In this configuration, the workcell 400 includes an enclosure 402 that has two internal layers such that internal computers, power supplies, and electronics may be positioned underneath each docking bay. In this example, an intermediate plate can be used for peripherals 404, 406, and 408 to dock to. An internal support structure can then transfer load to a base plate, for example.

Thus, within examples, workcells may be provided including modular docking bays arranged in an M×N array (e.g., 2×3 as shown in FIG. 1), and power circuitry and other computers can be arranged between rows of the modular docking bays. In other examples, workcells may be provided including modular docking bays arranged in a 1×M array (e.g., 1×3 as shown in FIG. 4), and power circuitry and computers can be arranged underneath a row of the modular docking bays.

In further examples, additional peripherals may include a sliding mechanism that couples between two docking modules, and another peripheral may attach to the slide to move from one docking bay to another. In this manner, the workcell may be positioned next to a conveyer belt, and a peripheral may move alongside the conveyer belt. Thus, multiple modules may be coupled together with a slide to combine two modules and extend a reach of one or more peripherals. The modules would be able to exchange geometry information with each other and the slide to perform calibration, for example.

Figure 5:
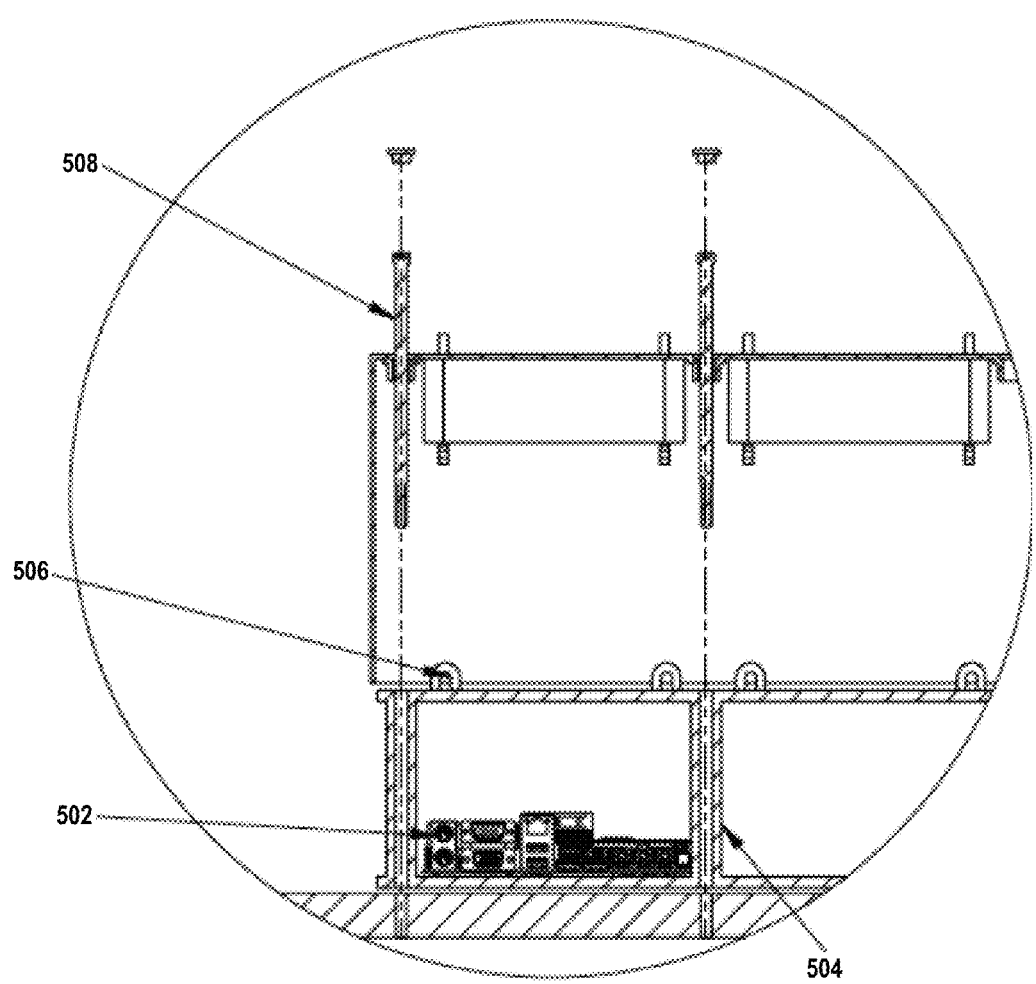
FIG. 5 illustrates an example two layer construction of an enclosure to support a 1×3 arrangement of docking bays and similar arrangements.

FIG. 5 illustrates an example two layer construction of an enclosure to support a 1×3 arrangement of docking bays and similar arrangements. In FIG. 5, internal electronics 502 within a lower layer are provided and constructed within a rigid metal frame 504. A docking module mounting plate 506 is attached to a top of the metal frame 504 such that docking modules can be attached to the docking module mounting plate 506 with bolts 508 or a similar mechanism.

Figure 6:
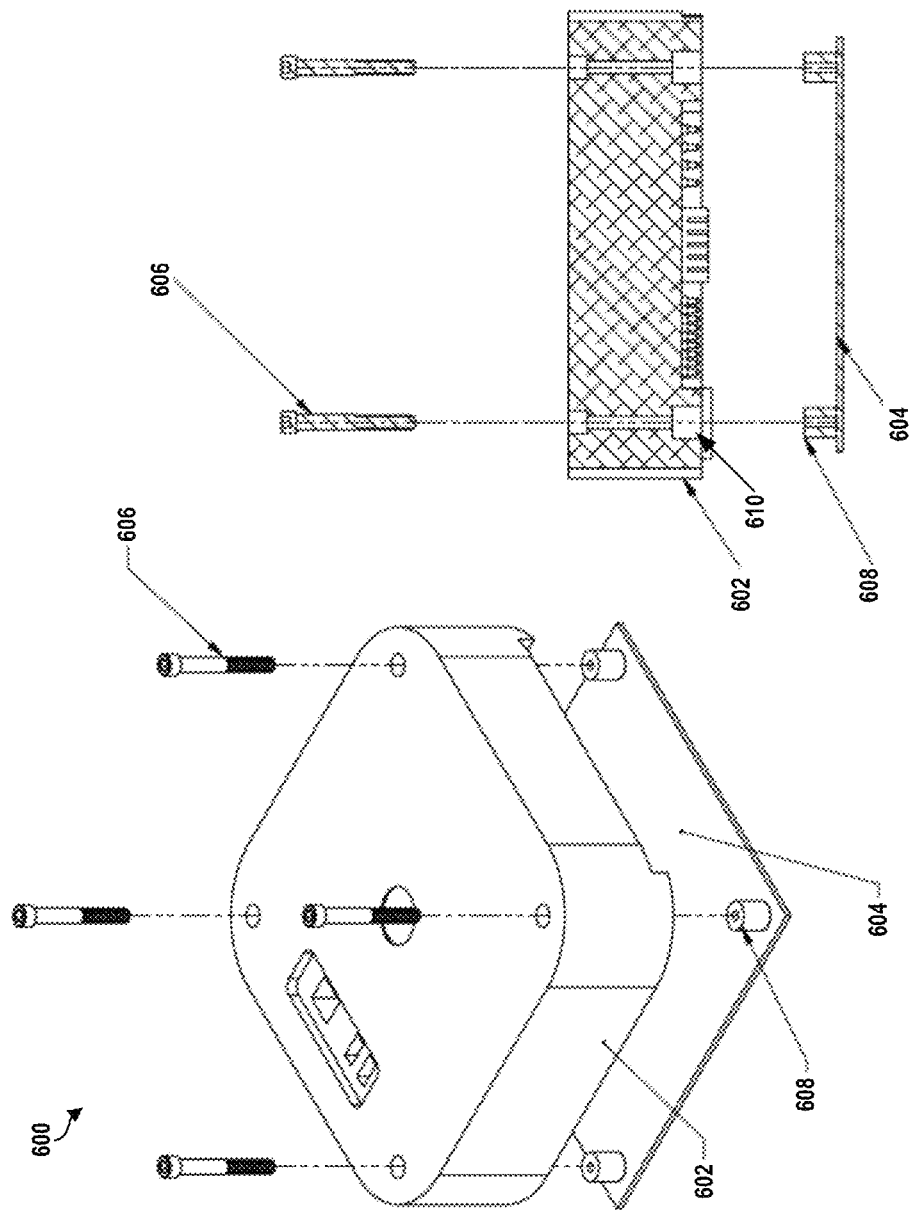
FIGS. 6A-6B illustrate a top and cross-sectional view of an example docking module 600.

FIGS. 6A-6B illustrate a top and cross-sectional view of an example docking module 600. The docking module 600 functions as an electrical and mechanical interface between a peripheral and the enclosure. The docking module 600 includes a housing 602 that transfers load from a peripheral to a bottom plate 604 of the enclosure. If the peripheral can produce high loads, such as with a robot arm, the housing 602 may be a rigid metal. If the peripheral produces lighter loads, such as with a camera, the housing 602 may be an injection molded plastic. Alternatively, the peripheral load may be transferred to the mounting surface through the enclosure shell. In this example, the enclosure side plates may be extruded, machined, cast, or sheet metal.

The docking module 600 may be inserted through a top of a base of a workcell along a single direction. The docking module 600 may be attached with one or more bolts 606 that screw into threaded features in the bottom plate 604. Each threaded feature may include an extended boss 608 that acts to precisely align the docking module 600 to the bottom plate 604 and to provide load transfer between the docking module 600 and the bottom plate 604. The boss 608 may include a taper to allow for initial alignment.

A threaded feature on the bottom plate 604 may form a precise slip fit with a receptacle 610 on the housing 602, as shown in FIG. 6B, to precisely align the docking module 600. Within examples, non-symmetric spacing of these features ensures that there is only one achievable insertion orientation.

Attachment and registration features of the housing 600, such as the receptacle 610, act to provide handedness such that a pose and orientation of the docking module 600 relative to the bottom plate 604 is precisely and uniquely defined. This allows a geometric calibration of an attached peripheral to be specified at design time up to a precision of a manufacturing process. Thus, the receptacle 610 may be a structural feature in the docking module 600 that aligns with the boss 608 structural feature of the modular docking bays to enable insertion of the docking module 600 in the fixed geometric configuration such that an orientation of the docking module 600 relative to the workcell is uniquely defined.

Figure 7:
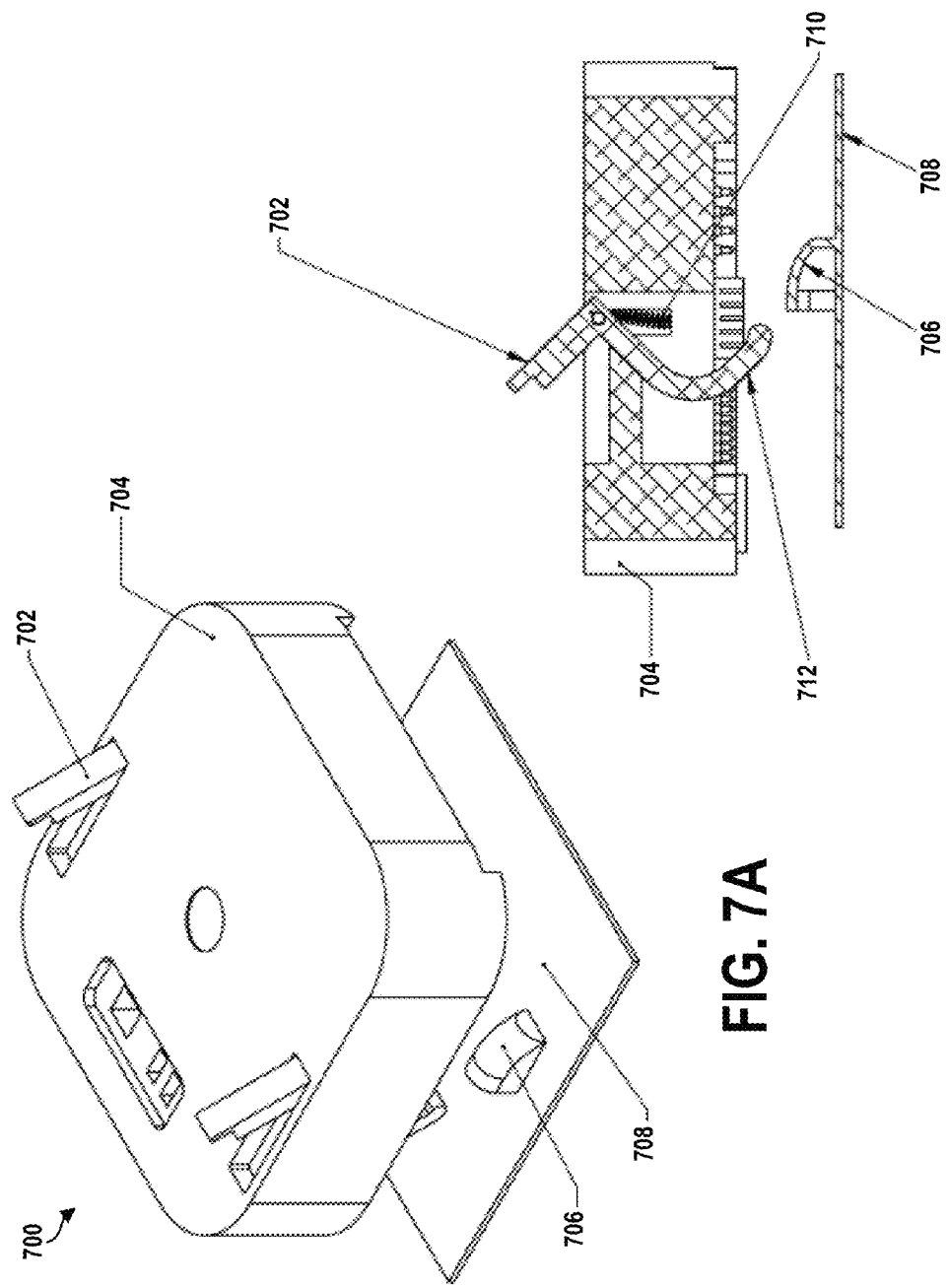
FIGS. 7A-7B illustrate insertion of an example docking module.

FIGS. 7A-7B illustrate insertion of an example docking module 700. The docking module 700 may be inserted using a tool-less method, for example. In this example, one or more lever arms 702 on a housing 704 of the docking module 700 engage with hooks 706 attached to a mounting plate 708. When the lever arm 702 is engaged with the hook 706, a constant clamping force is generated between the docking module 700 and the mounting plate 708. This force can be generated using a spring 710 or by using an over center cam contour 712 in the lever arm 702. The spring 710 allows the lever arm to flip into an up position when the docking module 700 is detached. Other mechanisms can be used to generate a same effect of creating a rigid connection by a constant pressure between the docking module 700 and the mounting plate 708.

Figure 8:
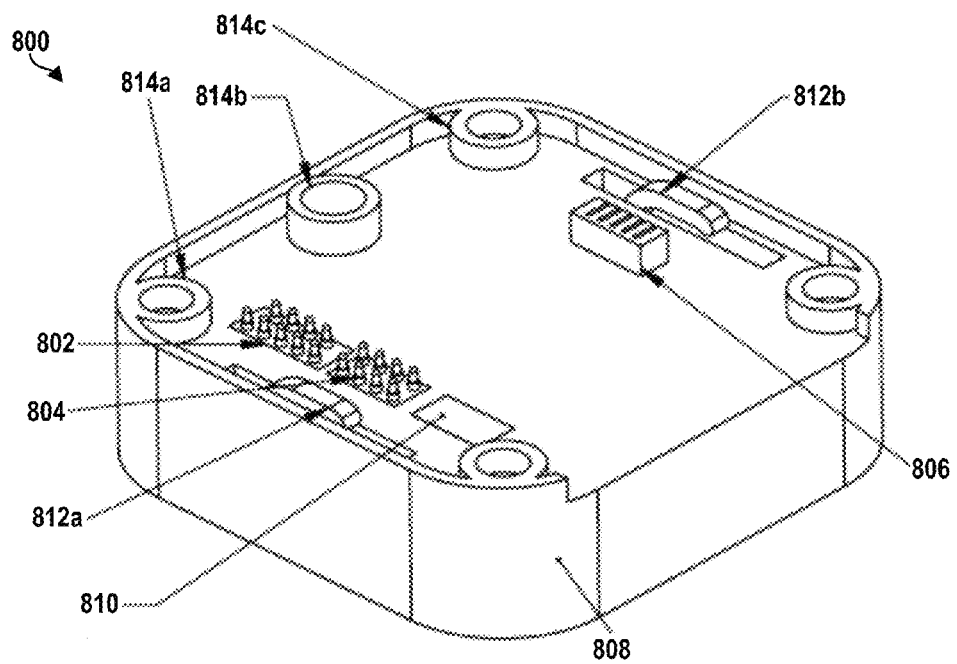
FIG. 8 illustrates a bottom view of an example docking module.

FIG. 8 illustrates a bottom view of an example docking module 800. The docking module 800 enables electrical quick connections between peripheral electronics and enclosure electronics. To achieve an electrical quick connection, spring loaded pin connectors 802 and 804 (e.g., pogo pins) may be used to contact against foil of a rigid PCB. Alternatively, a metal blade connector 806 can be used that inserts into a mating receptacle. Other similar quick connect technologies can be employed that enable appropriate tolerance to misalignment during module insertion.

The docking module 800 including a housing 808 which includes a PCB that provides the quick-connect connectors 802, 804, 806, and 810. Each connector is routed on the PCB or wiring harness to internal electronics of the peripheral. A location and function of each connector can be a fixed according to an electrical interface specification. This allows for modular connection of a range of peripheral devices that adhere to the electrical interface specification.

As shown in the FIG. 8, the connector 802 is a nine-pin bus, the connector 804 is an eight-pin bus, and the connector 806 is a five-blade power bus. If a peripheral does not support a particular connector functionality, a location of the connector may be left blank, as shown by the connector location 810. A docking module needs to only populate pins for the communication and power busses that are required for that specific module. A geometric arrangement is such that absence of a connector's spring pins results in no electrical connection being made to the peripheral for that particular bus.

The docking module 800 is also shown to include features to couple to a bottom plate, such as lever arms 812a-b, and alignment receptacles 814a-c. The alignment receptacles 814a-c may align with extended bosses within which screws can be inserted to fasten the docking module to the bottom plate, for example.

Figure 9:
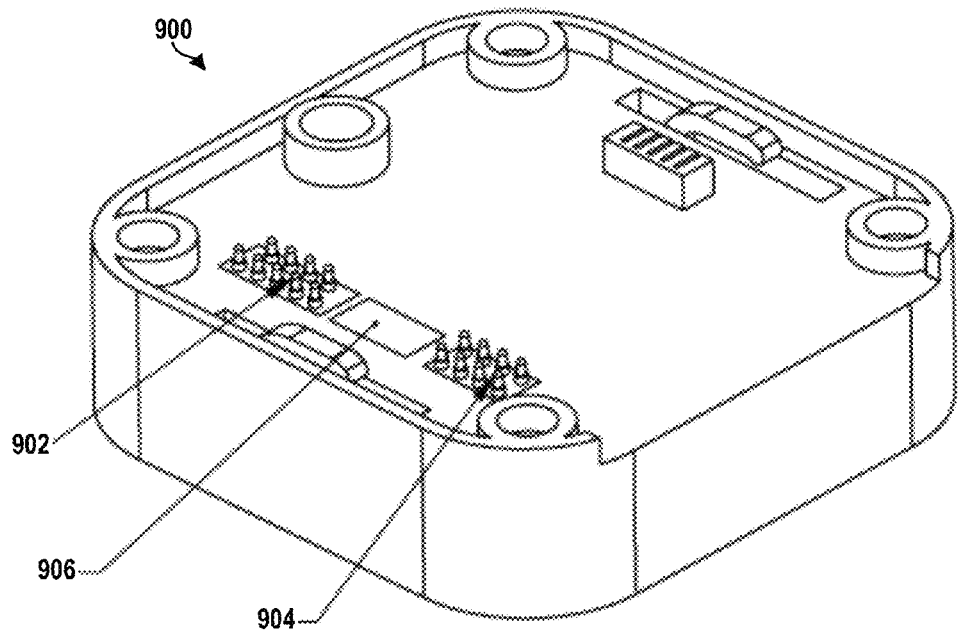
FIG. 9 illustrates a bottom view of another example docking module.

FIG. 9 illustrates a bottom view of another example docking module 900. In FIG. 9, an alternate spring connector configuration is provided for the docking module 900. In this configuration, a peripheral supports a nine-pin bus 902 and an eight-pin bus 904 as well as a power bus. Another bus location 906 is not supported, and is left blank. Thus, docking modules can provide different types of buses, and by populating different component locations of the docking modules, a customized connection can be implemented for a specific peripheral.

Figure 10:
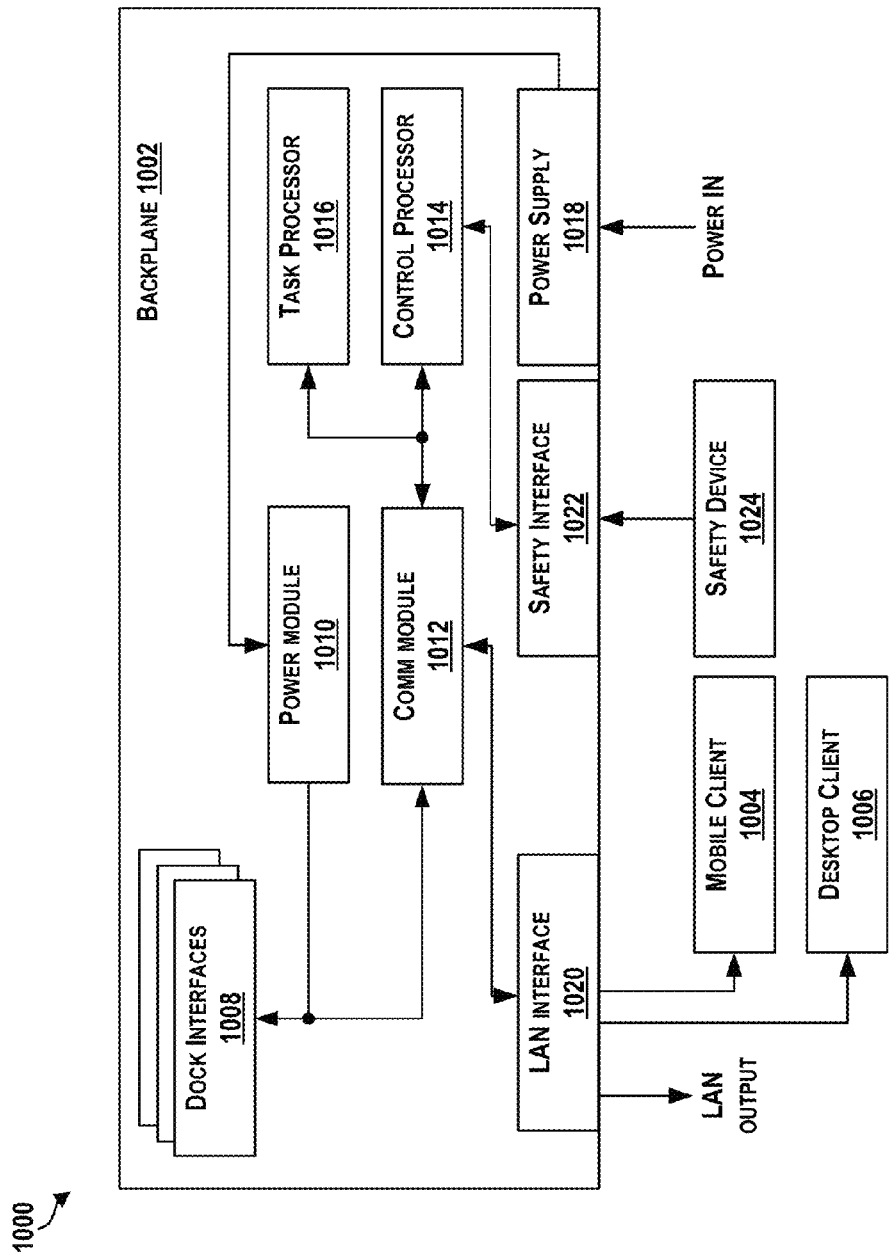
FIG. 10 is a block diagram illustrating example functional architecture of components of a workcell.

FIG. 10 is a block diagram illustrating example functional architecture of components of a workcell 1000. The workcell includes a backplane electrical subsystem 1002 that couples to clients, such as a mobile client 1004 and a desktop client 1006, or other integrated displays and input devices that provide graphical user interfaces to allow a user to configure and program the workcell 1000. For instance, the mobile client 1004 may be a tablet device that communicates wirelessly with the workcell 1000.

The backplane 1002 includes modular bay dock interfaces 1008, a power module 1010, a communication module 1012, a control processor 1014, a task processor 1016, a power supply 1018, a local area network (LAN) interface 1020, and a safety interface 1022.

The backplane 1002 provides electrical interconnection of the dock interfaces 1008, the power module 1010, the communication module 1012, and CPUs 1014 and 1016. The backplane 1002 may comprise one or more interconnected PCBs. The modular bay dock interfaces 1008 enable a docking module to couple to the workcell 1000. For example, the dock interface 1008 provides digital communication, power, and mechanical attachment to attached peripherals, and may define electrical, mechanical, and software standards required of all compatible peripherals.

The power module 1010 distributes power from the power supply 1018 to each dock interface 1008 and processor 1014 and 1016. The power module 1010 may include power monitoring, soft start, safe shutdown, and uninterruptable power supply features. The power supply 1018 may convert battery or line (AC) power to generate one or more supply voltages required to power the connected peripherals and the on-board computers.

The communication module 1012 may route communication bus signals from each dock interface 1008 to network interfaces of the CPUs and LAN. The communication module 1012 may comprise one or more USB, EtherCAT, Ethernet hubs, switches, or crossover pass through, as well as other common bus types. The LAN interface 1020 provides a wired or wireless networked connection from the backplane 1002 to other devices.

The control processor 1014 provides deterministic real-time control of one or more actuated devices, and communicates on a real-time control bus (such as EtherCAT) to each dock interface 1008. The task processor 1016 provides task execution services, computation for sensing and perception, data management and analytics services, non real-time control of actuated devices, and network interfaces (USB, Ethernet) to external devices. The task processor 1016 and control processor 1014 may be separate cores on one CPU, a single core, or separate cores on separate computers, as desired.

The safety interface 1022 provides electrical and mechanical connection of an external safety device 1024 (such as an emergency-stop) to the backplane 1002.

The workcell 1000 may be provided in an enclosure, and a top plate of the enclosure functions as a calibrated work surface for an automation task. The work surface may include mounting points for attaching stationary items to enable the task, such as assembly jigs.

To kinematically register a docking module to the enclosure, any number of methods may be used. One method includes engaging three pins in the bottom plate of the backplane 1002 into three slots in the docking module housing. This uniquely and precisely constrains an orientation of the module with respect to the bottom plate when installed.

The workcell 1000 may include features to seal the enclosure when a peripheral is installed. For example, a gasket or rubber o-ring can be attached to the peripheral docking module bottom side. The enclosure top plate has a mating lip feature. When the module is installed, a clamping force of the module to the enclosure bottom plate causes the gasket to form a seal between the peripheral and the top plate.

The workcell 1000 may be attached to a flat surface such as a table, wall, or ceiling. The bottom plate may include through-hole features such that a bolt from above may attach the bottom plate to the surface. A removeable plug seal may be employed to access an attachment feature yet keep the enclosure sealed. Conversely, the bottom plate may include thread hole features such that a bolt from below may pull the bottom plate into the surface.

The workcell 1000 can include lighting (LED) and speakers to provide feedback to a user during operation and during configuration. These modalities can be used to notify a user of a malfunction or that the workcell 1000 is in operation. These modalities can also be used to enhance a user experience. For example, an audible 'click' can be generated whenever a peripheral is plugged in and successfully interrogated.

Figure 11:
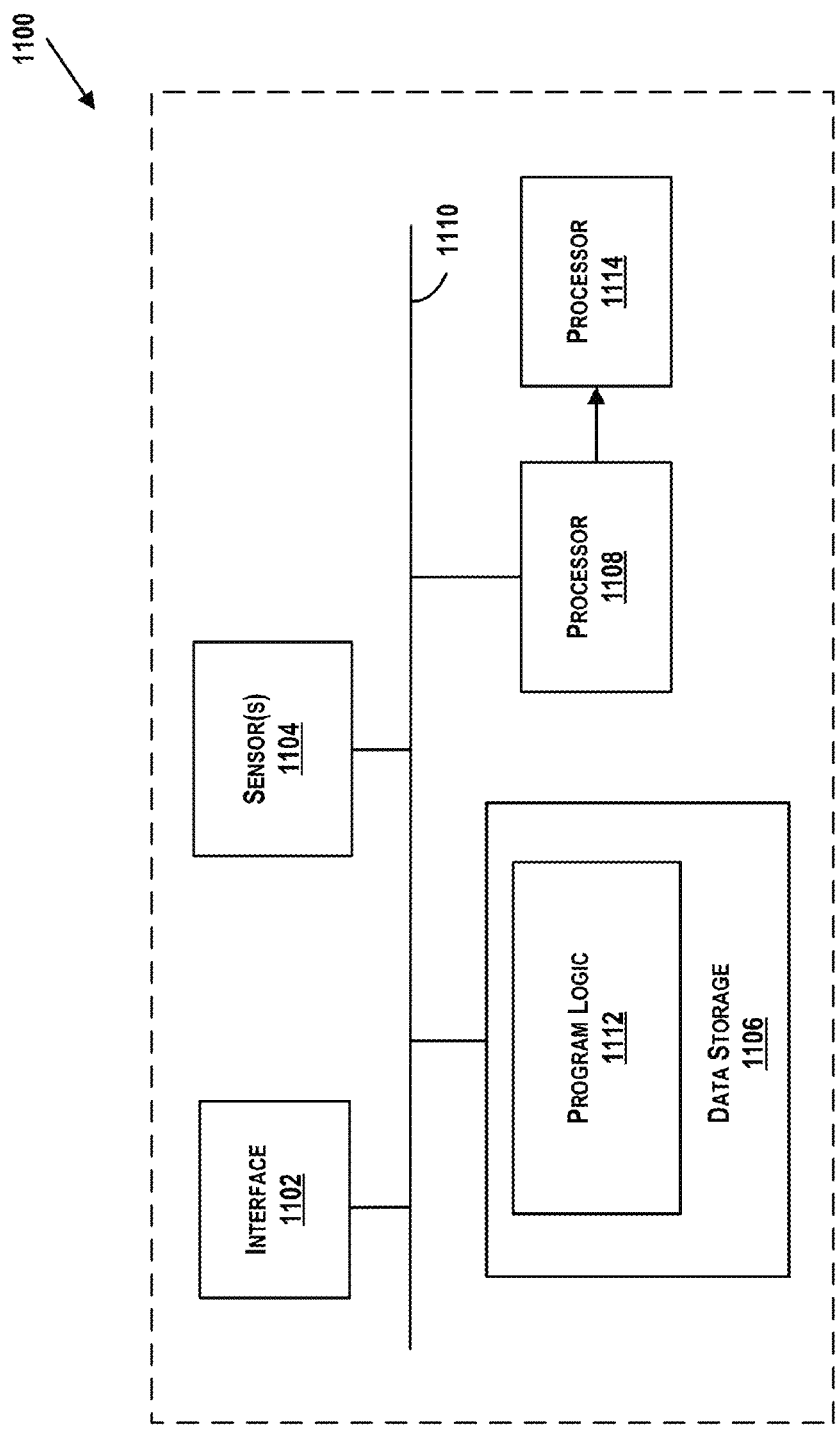
FIG. 11 illustrates a schematic drawing of an example computing device.

Many components of the workcell 1000 may take the form of a computing device, such as illustrated in FIG. 11, which illustrates a schematic drawing of an example computing device 1100. In some examples, some components illustrated in FIG. 11 may be distributed across multiple computing devices. However, for the sake of example, the components are shown and described as part of one example device 1100. The device 1100 may be or include a mobile device, desktop computer, tablet computer, or similar device that may be configured to perform the functions described herein.

The device 1100 may include an interface 1102, sensor(s) 1104, data storage 1106, and a processor 1108. Components illustrated in FIG. 11 may be linked together by a communication link 1110. The communication link 1110 is illustrated as a wired connection; however, wireless connections may also be used. The device 1100 may also include hardware to enable communication within the device 1100 and between the device 1100 and another computing device (not shown), such as a server entity. The hardware may include transmitters, receivers, and antennas, for example.

The interface 1102 may be configured to allow the device 1100 to communicate with another computing device (not shown), such as a server. Thus, the interface 1102 may be configured to receive input data from one or more computing devices, and may also be configured to send output data to the one or more computing devices. The interface 1102 may also be configured to receive input from and provide output to a torque controlled actuator, modular link of a robot arm, or other peripheral of a docking module, for example. The interface 1102 may include a receiver and transmitter to receive and send data. In other examples, the interface 1102 may also include a user-interface, such as a keyboard, microphone, touchscreen, etc., to receive inputs as well.

The sensor 1104 may include one or more sensors, or may represent one or more sensors included within the device 1100. Example sensors include an accelerometer, gyroscope, pedometer, light sensors, microphone, camera, or other location and/or context-aware sensors that may collect data of the peripheral (e.g., motion of arm) and provide the data to the data storage 1106 or processor 1108.

The processor 1108 may be configured to receive data from the interface 1102, sensor 1104, and data storage 1106. The data storage 1106 may store program logic 1112 that can be accessed and executed by the processor 1108 to perform functions executable to determine instructions for operation of the robot arm. Example functions include calibration of attached peripherals, operation of attached peripherals, safety detection functions, or other application-specific functions. Any functions described herein, or other example functions for the workcell may be performed by the device 1100 or processor 1108 of the device via execution of instructions stored on data storage 1106.

The device 1100 is illustrated to include an additional processor 1114. The processor 1114 may be configured to control other aspects of the device 1100 including displays or outputs of the device 1100 (e.g., the processor 1114 may be a GPU). Example methods described herein may be performed individually by components of the device 1100, or in combination by one or all of the components of the device 1100. In one instance, portions of the device 1100 may process data and provide an output internally in the device 1100 to the processor 1114, for example. In other instances, portions of the device 1100 may process data and provide outputs externally to other computing devices.

Figure 12:
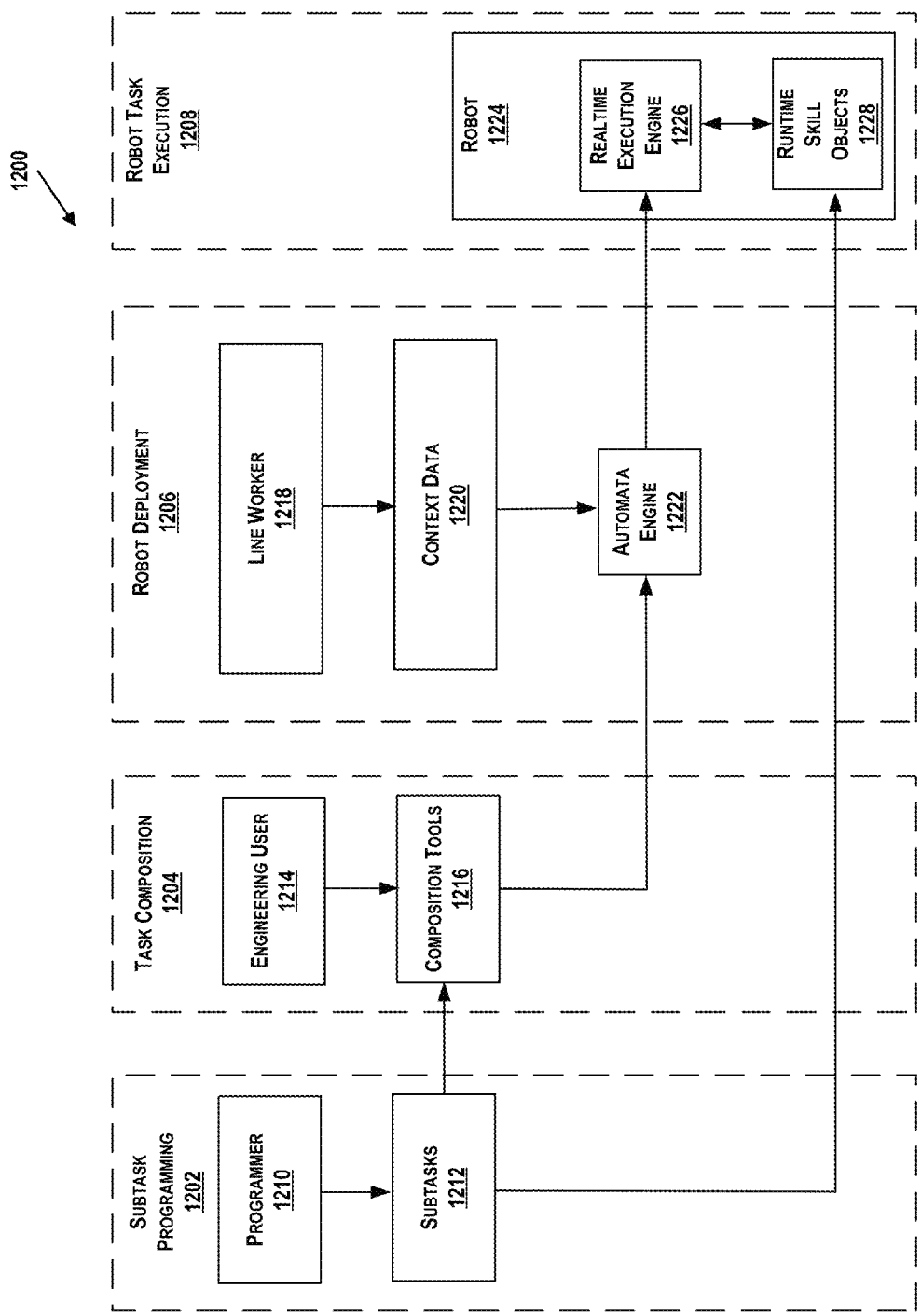
FIG. 12 illustrates an example tiered model for robot programming and task execution.

FIG. 12 illustrates a tiered model 1200 for programming a robotic system to perform tasks. The tiered model 1200 includes four separate tiers: (1) a subtask programming tier 1202, (2) a task composition tier 1204, (3) a robot deployment tier 1206, and (4) a robot task execution tier 1208. The subtask programming tier 1202 may be performed by a programmer 1210, as an example. The programmer 1210 may create subtasks 1212 that are operable in a robotic system. A subtask 1212 is a well-defined module of robot behavior that performs actions with task level meaning Example subtasks include Pick Up Object, Place Object, Move to Location/Orientation, Apply Force, etc. Subtasks 1212 may be combined to complete a given task, as discussed in more detail below. Subtasks 1212 may include a parameter list of data required for execution on the robot. One or more parameters may be left undefined at the subtask programming tier 1202. Such a configuration allows for late binding of parameters, allowing for more flexibility in designing particular robotic systems.

Subtasks 1212 may be programmed at a high level so that they are distinct from the exact robot hardware on which they run. Thus, part of a subtask 1212 may be a hardware definition or requirement specification. Such a configuration allows for easy automatic acceptance or rejection of any subtask on any specific hardware. Subtasks 1212 may also have clear failure modes and conditions, such that they are easily executable on a robot. Further, subtasks 1212 may also have a runtime component which, when all parameters are provided (e.g., bound to particular values or objects), may execute on a robot.

The task composition tier 1204 may be performed by an engineering user 1214, as an example. The engineering user 1214 may request a given task be performed by the robotic system. A computing device in communication with the robotic system may responsively determine one or more subtasks 1212 required to perform the given task. A task is a linear combination of subtasks 1212 that represent a user level unit of work. Due to the clear failure modes of each individual subtasks 1212, this linear combination can be expanded into an Automata (e.g., finite state machine, DFA, etc.) for computerized evaluation and execution. Using composition tools 1216 on a computing device, each subtask 1212 for a given task may be placed in relation to other subtasks 1212 to form a flowchart. As discussed above, each subtasks 1212 may have one or more parameters used to define the particular subtasks. The parameters may be defined in the task composition tier 1204, or may be defined later in the robot deployment tier 1206. Each subtask 1212 may be further defined by choosing task specific override actions for the failure or exit conditions.

The robot deployment tier 1206 may be performed by a line worker 1218, as an example. To deploy a specific task on specific robot peripherals, each of the parameters of the subtasks 1212 must be defined. In one example, a computing device in communication with the robotic system may receive an input defining the one or more undefined parameters. In another example, the computing device may use context data 1220 to define the one or more undefined parameters. Context data 1220 may include data driven by sensors of the robotic system, hardware specifications, safety settings of the robotic system, calibration settings, or environment data. Other data is possible as well. Based on the data from the composition tools 1216 in the task composition tier 1204 and the context data 1220, an automata engine 1222 may be used to generate a full automata definition with bindings for all parameters in each subtask 1212. The result is a complete automata object with all parameters bound to objects or literals.

The robot task execution tier 1208 includes a robot 1224 with a realtime execution engine 1226 configured to interpret the fully parameterized automata object and translate it into specific actions on the robot 1224. Each subtask 1212 is configured with a runtime skill object to handle movement of the robot 1224 for performing its function. The realtime execution engine 1226 coordinates passing control between subtasks 1212 based on the automata definition, states, conditions and failures encountered.

Figure 13A:
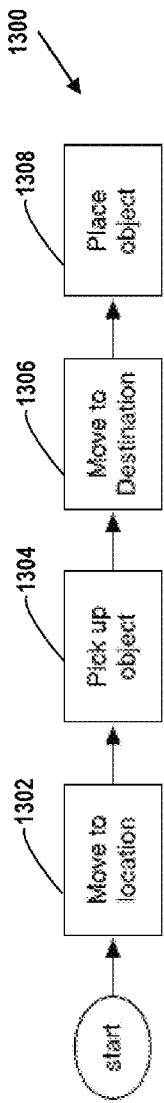
FIG. 13A illustrates a simple task composition, in accordance with an example embodiment.

One goal of the system described herein is to keep the visual representation simplified and human centric, while still maintaining all of the data necessary to produce a larger, deterministic, machine executable form. FIG. 13A illustrates a simple task composition 1300, in accordance with an example embodiment. The task composition 1300 bears resemblance to a human understanding of a particular task, and is a linear flowchart designed to complete that task. In particular, the task composition 1300 includes various subtasks, including Move to location 1302, Pick up object 1304, Move to destination 1306, Place object 1308. When executed, the robotic system would be configured to complete the given task of moving an object from one location to another.

Figure 13B:
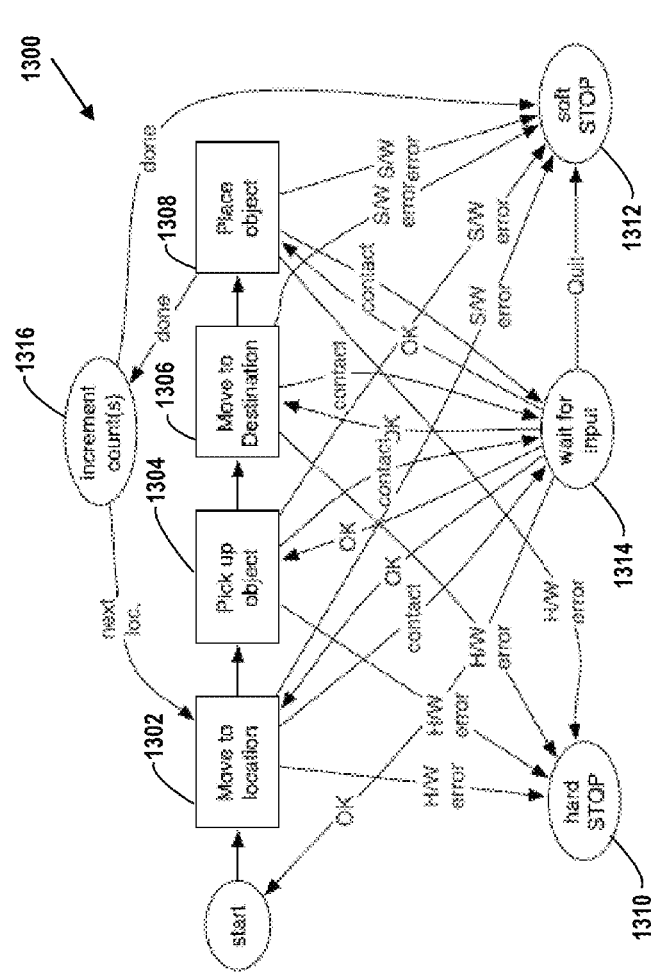
FIG. 13B illustrates example conditions and failure modes for the task composition of FIG. 13A.

FIG. 13B illustrates an automata that is automatically generated to implement the task composition 1300 described above based on default exception behavior of the failure and exit modes of the subtasks. As shown in FIG. 13B, each subtask may be configured to check for hardware and software errors. If a hardware error is detected, the robotic system may be configured to hard stop 1310 until the error is corrected. If a software error is detected, the robotic system may be configured to soft stop 1312 until the error is corrected. Further, each of the subtasks may be configured to detect undesired contact, such that if a component of the robotic system experiences an unanticipated contact, the robotic system may stop and wait for an input 1314 before proceeding. In addition, the "Place object" subtask 1308 may be configured to increment count(s) 1316 of a number of object placed in the desired location. By moving such information to the background, a user may design and implement tasks in a much more simplistic and human centric way.

Figure 14A:
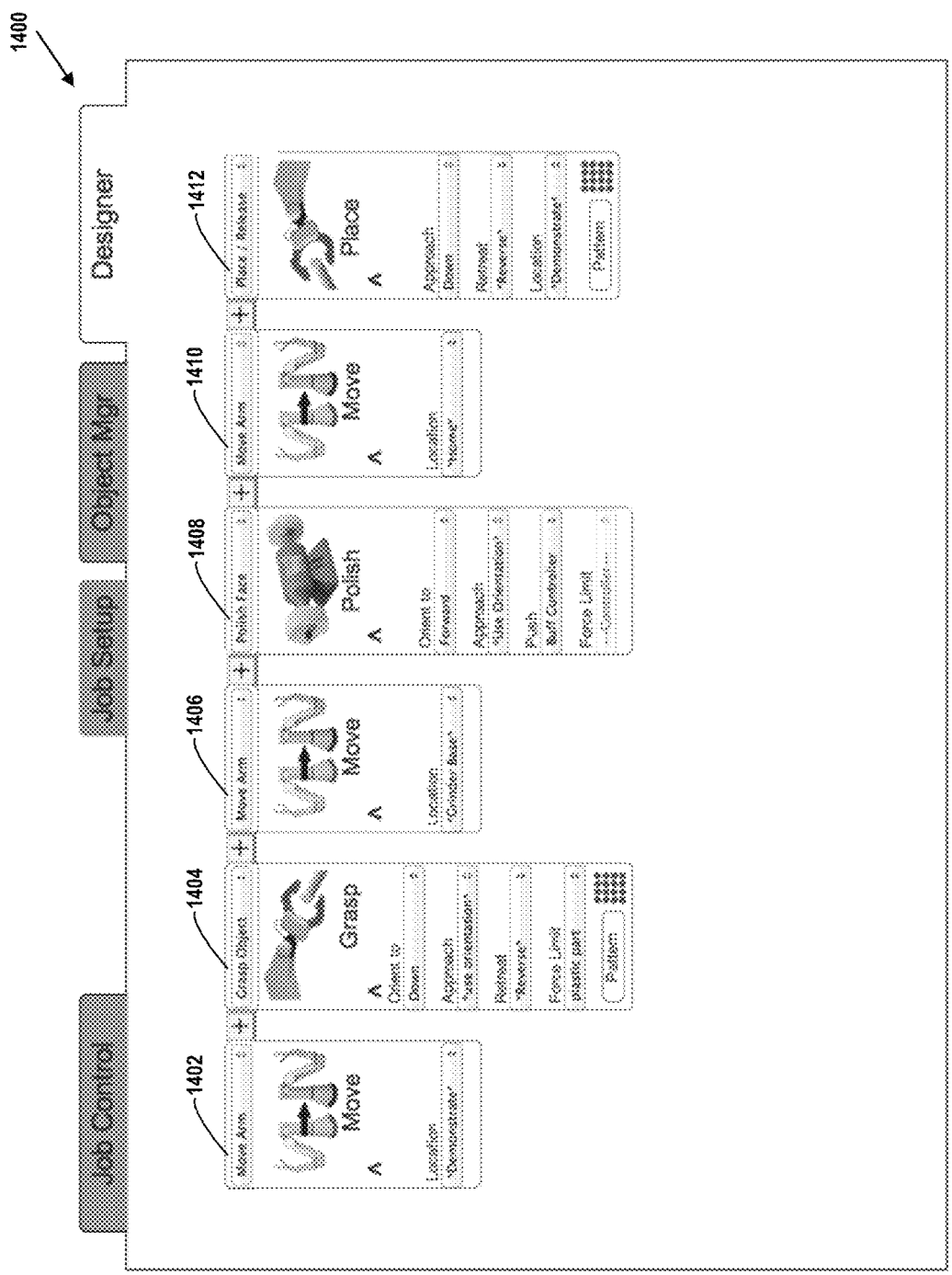
FIGS. 14A-14F illustrate an example task composition interface, in accordance with an example embodiment.

FIGS. 14A-14F illustrates an example task composition interface. FIG. 14A illustrates an arrangement of subtasks to complete a given task. In this example, the task is to polish an object and place the object in a desired location. The subtasks used to perform this task include move 1402, grasp 1404, move 1406, polish 1408, move 1410, and place 1412. Each of the subtasks have one or more parameters used to define that particular subtasks. For example, the move subtasks 1402, 1406, 1410 may include a "Location" parameter used to define the location of where the robot arm should move to. The grasp 1404 subtask may include an "Orient to" parameter used to defined what direction the gripper is facing when grasping an object, an "Approach" parameter used to define how the gripper should approach an object, a "Retreat" parameter used to define how the gripper should move after grasping an object, a "Force Limit" parameter used to define how much force the gripper should use when grasping an object, and a "Location" parameter used to define an area in which the gripper grabs the objects. The polish 1408 subtask may also include an "Orient to" parameter, an "Approach", a "Push" parameter and a "Force Limit" parameter. The place 1412 subtask may also include an "Approach" parameter, a "Retreat" parameter, and a "Location" parameter.

As shown in FIG. 14A, each subtask may include a pull down menu for each parameter, such that a user may define a given parameter or select a manner in which the parameter may be defined. The parameters may be unresolved in various forms until runtime of the robotic system. At runtime, the parameters need to be bound to either a literal, variable, object property or object. Prior to runtime, the parameters may be bound to literals or symbols which are resolved at a later time. One example symbol may be "Demonstrate," where at runtime a user will move a robotic component to resolve this reference. Another example symbol may be "Home," which is a pre-defined position and orientation of a robotic component. Another example symbol may be a particular environment object name (e.g., "Grinder Base"), that has a specified position and orientation based on the orientation of the base of the given peripheral. Other example symbols are possible as well. One or more of the parameters may be automatically filled in based on a default setting. The default setting may be based at least in part by sensor data from one or more sensors of the robotic system.

Figure 14B:
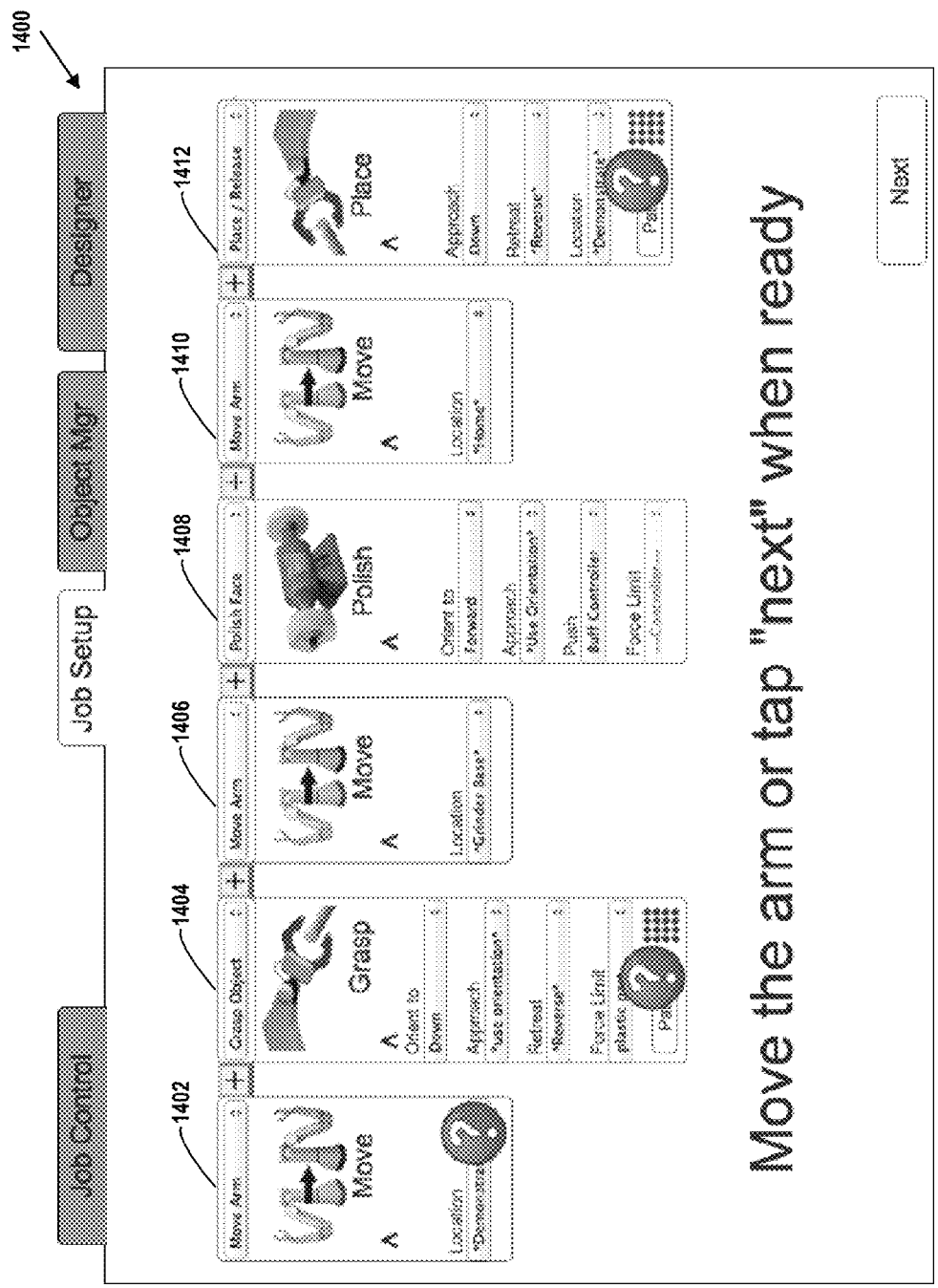
Figure 14C:
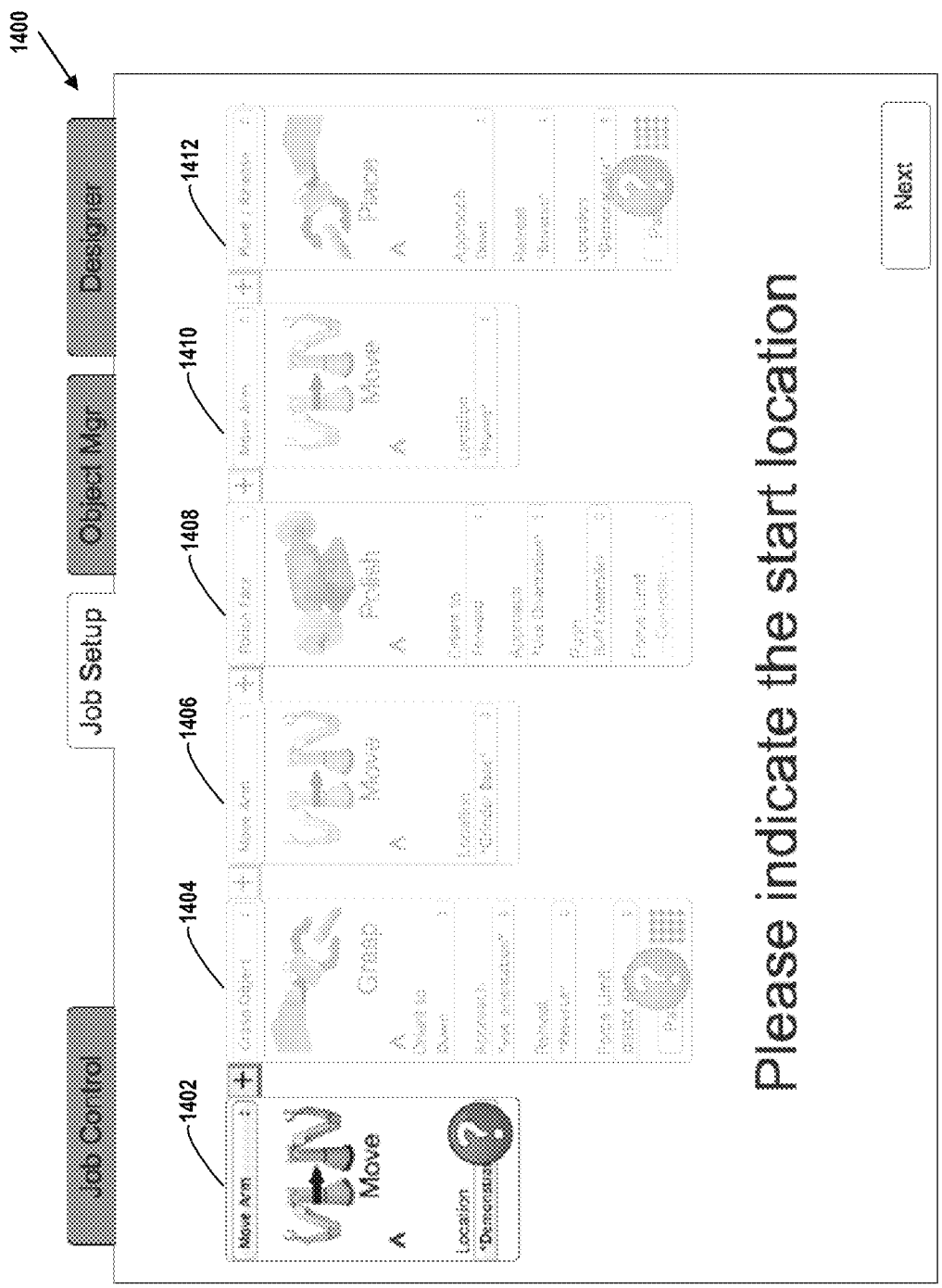

FIG. 14B illustrates an indication of the one or more undefined parameters for the given task. For the move 1402 subtask, the "Location" parameter is set to "Demonstrate." As such, the interface 1400 may display a command to move the arm to the desired location. In one example, a user may physically move the arm to the desired location. In another example, the user may control the robot arm with a joystick or other means to move the robot arm to the desired location. The robotic system may record the movement, and store the location to define the "Location" parameter for the move 1402 subtask. FIG. 14C illustrates an example command to indication the start location for the move 1402 subtask.

Figure 14D:
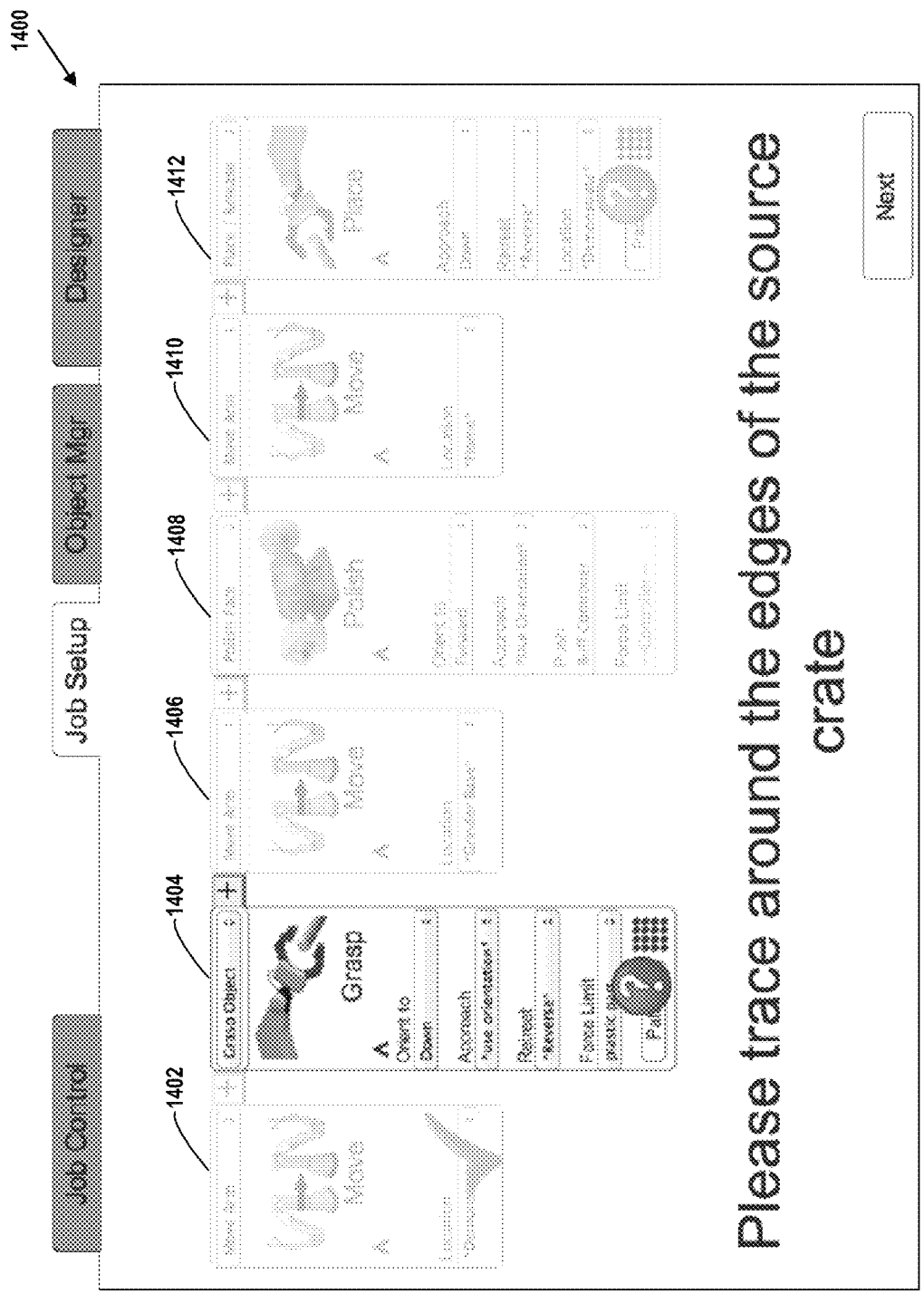
Figure 14E:
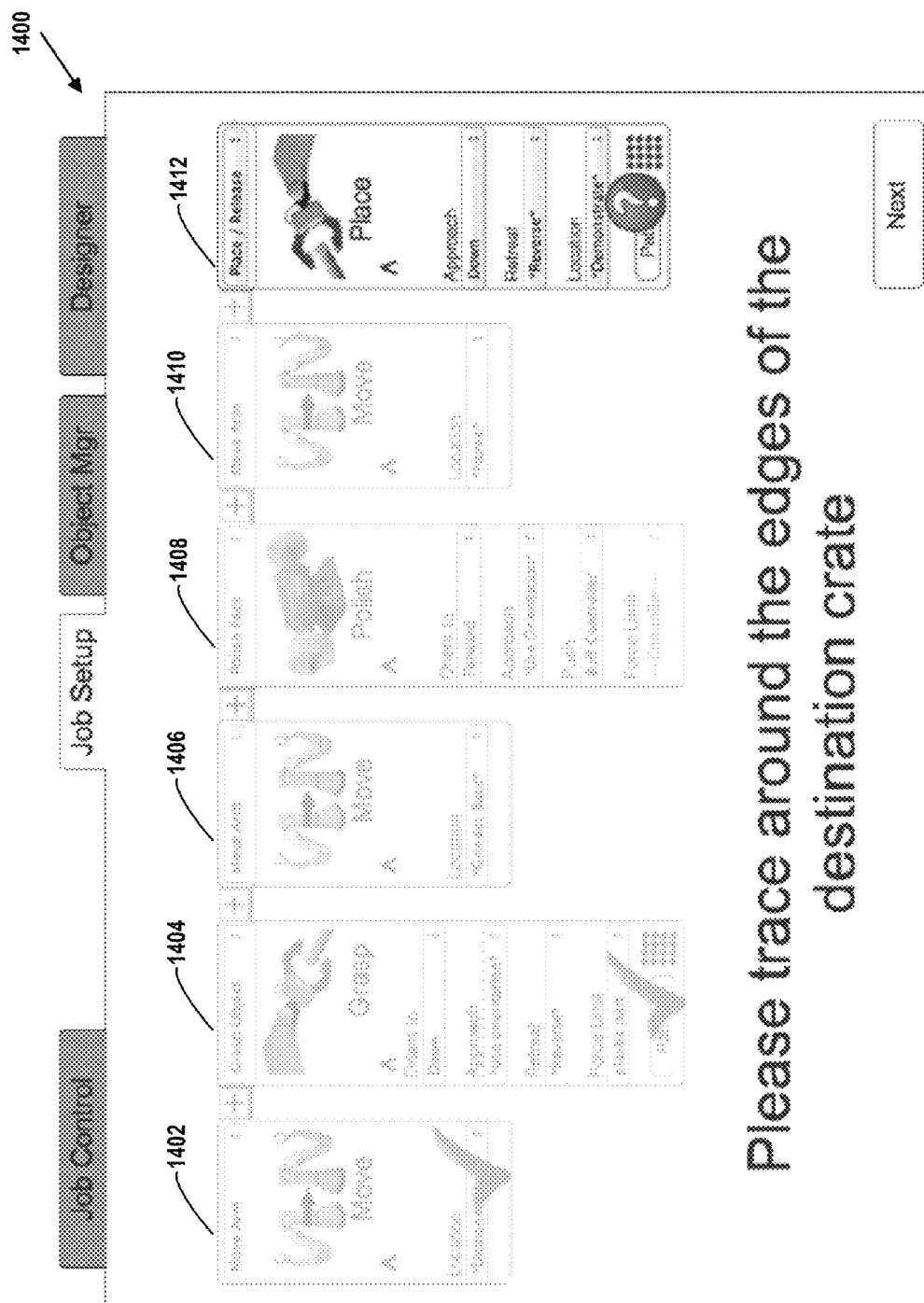

FIG. 14D illustrates an example command to trace around the edges of a source crate where objects are stored to be grasped by the gripper of a robotic arm. In one example, a user may physically move the gripper around the edges of the source crate to define the geometrical bound of the pick grid. In another example, the user may control the robot arm with a joystick or other means to move the gripper around the edges of the source crate. The robotic system may record the movement, and store the geometrical bound to define the "Location" parameter for the grasp 1404 subtask. Similarly, FIG. 14E illustrates a command to trace around the edges of the destination crate where polished objects are stored to define the "Location" parameter for the place 1412 subtask.

Figure 14F:
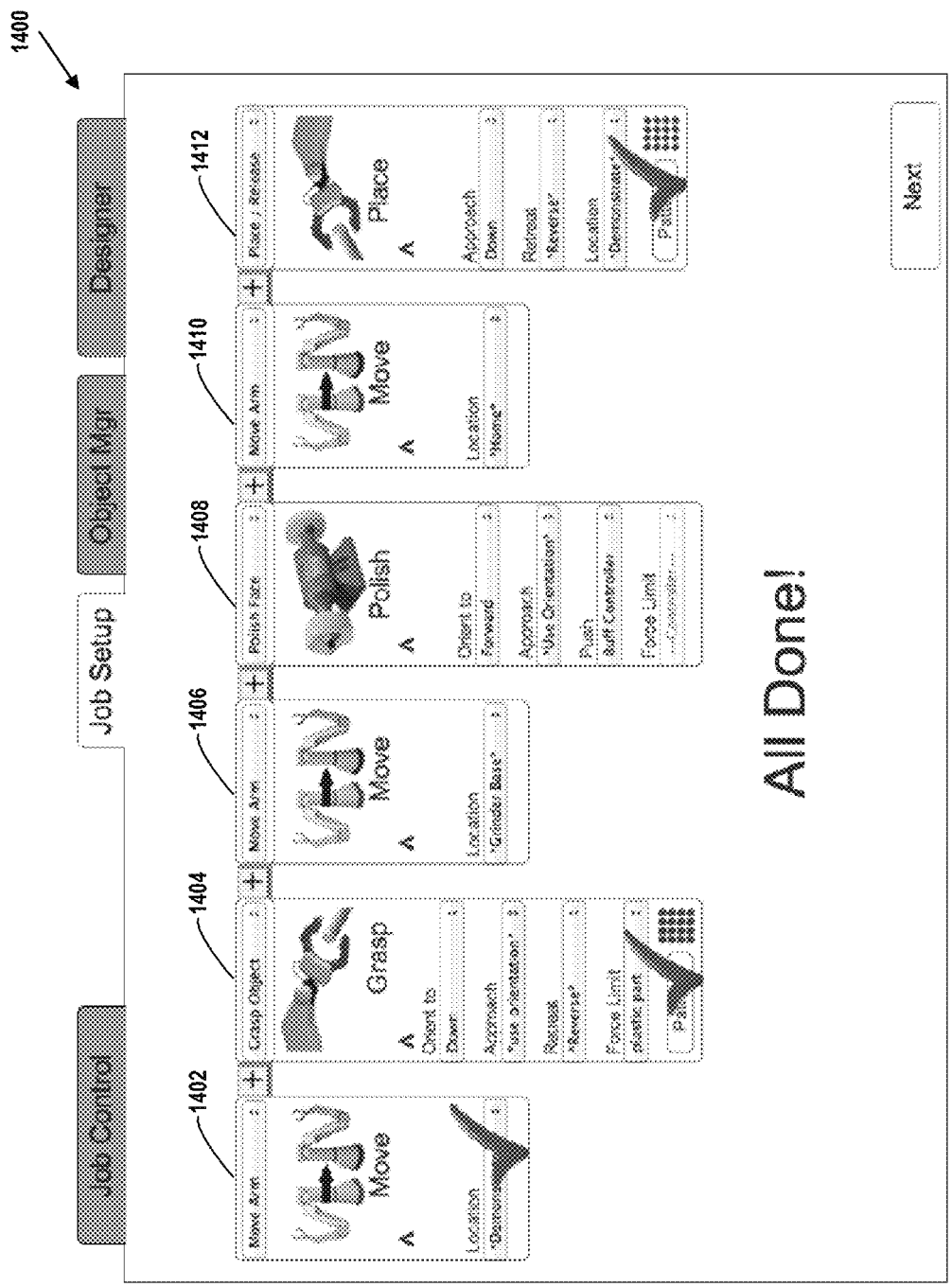

FIG. 14F illustrates a visual representation showing a user that all of the undefined parameters have been defined. The robotic system may execute the subtasks in the determined arrangement and in accordance with the defined parameters to perform the given task.

Further, the robotic system may execute each subtask individually as the task is composed. For example, a user may cause the robotic system to execute the move 1406 subtask first, to ensure that particular subtask is working. Next, the user may cause the robotic system to execute the move 1410 subtask. Each subtask may be executed individually, and in any order. That way, any potential problems may be discovered before running the full workflow to complete the given task.

Within some examples herein, operations may be described as methods for performing functions, and methods may be embodied on a computer program product (e.g., a tangible computer readable storage medium or non-transitory computer readable medium) that includes instructions executable to perform the functions.

Figure 15:
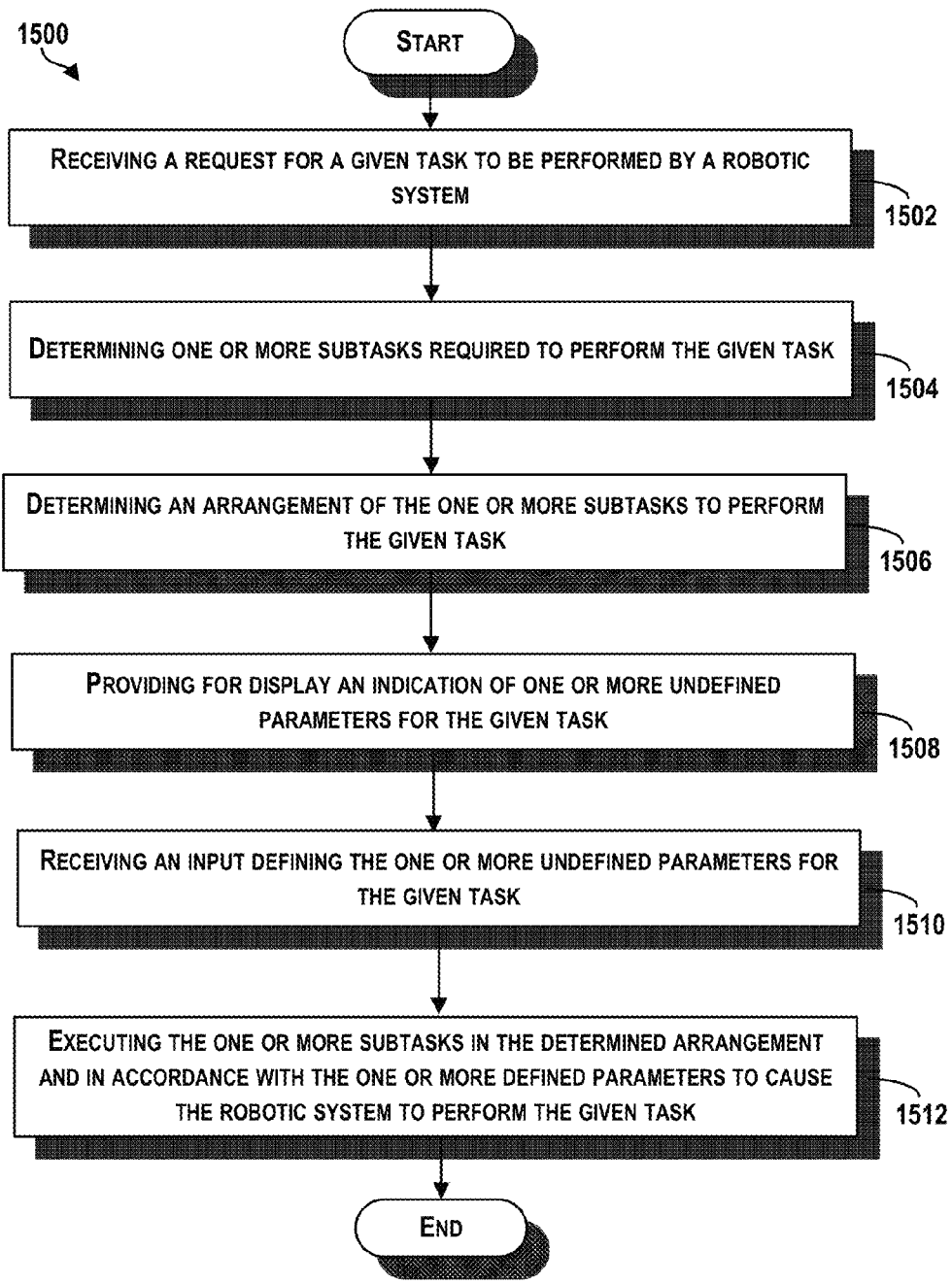
FIG. 15 is a flowchart illustrating an example method.

FIG. 15 is a flowchart illustrating an example method 1500 for configuring a workcell to perform a given task. Method 1500 may be performed by a computing device positioned inside an enclosure of a modular reconfigurable workcell. In another example, method 1500 may be performed by a computing device in wired or wireless communication with the robotic system. Further, the given computing device may provide a wired or wireless client interface that enables a user to provide input to the workcell and visualize the workcell from a tablet, mobile phone, or other such device.

Referring to FIG. 15, at block 1502, the method 1500 includes receiving a request for a given task to be performed by a modular reconfigurable workcell. In on example, the task may be chosen from a list of tasks capable of being performed by the workcell. At block 1504, the method 1500 includes determining one or more subtasks required to perform the given task. In one example, the one or more subtasks are performed by one or more peripherals. The computing device may store a list of peripherals available to the system, along with specific subtasks that each peripheral is capable of performing. The computing device may compare the subtasks needed to complete the given task, and determine which peripherals are needed to complete the subtasks. Further, the computing device may optimize the peripherals from the set of one or more peripherals. For example, if two subtasks of the given task each need camera peripherals, a single camera peripheral would be sufficient. As another example, if one subtask of the given task requires a low resolution camera peripheral, and another subtask requires a high resolution camera peripheral, the computing device will optimize the system to determine only one high resolution camera peripheral is necessary to perform all of the subtasks of the given task.

At block 1506, the method 1500 includes determining an arrangement of the one or more subtasks to perform the given task. The arrangement includes a combination of the one or more subtasks in a particular order, as shown in FIGS. 14A-14F. In one example, the computing device may store templates for various tasks. In such a case, the computing device may receive the request for a given task, and recommend a template for that task. The template may include a list of one or more subtasks required to perform the task, along with the arrangement of those subtasks. Other examples are possible as well.

At block 1508, the method 1500 includes providing for display an indication of one or more undefined parameters for the given task. FIGS. 14B-14E illustrate an example indication for undefined parameters. At block 1510, the method 1500 includes receiving an input defining the one or more undefined parameters for the given task. As one example, the input defining the one or more undefined parameter may include moving a component of the robotic system to define a geometrical bound for the component. As another example, the input defining the one or more undefined parameter may include moving a component of the robotic system to define a destination location for the component. As yet another example, the input defining the one or more undefined parameter may include selecting an option for the parameter in a pull-down menu of an interface on the computing device. Other examples are possible as well.

At block 1512, the method 1500 includes executing the one or more subtasks in the determined arrangement and in accordance with the one or more defined parameters to cause the robotic system to perform the given task.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method operable by a computing device, the method comprising:

receiving a request for a given task to be performed by a robotic system, wherein the robotic system includes a modular reconfigurable workcell including two or more modular docking bays on a surface of the workcell that support attachment of two or more docking modules in a fixed geometric configuration;

determining two or more subtasks required to perform the given task, wherein the two or more subtasks are performed by two or more peripherals attached to the two or more docking modules of the robotic system, wherein a first peripheral of the two or more peripherals is configured to perform a first set of subtasks and a second peripheral of the two or more peripherals is configured to perform a second set of subtasks, wherein the two or more subtasks include one or more parameters used to define the two or more subtasks, wherein the one or more parameters include information required for the robotic system to execute a given subtask, and wherein at least one of the one or more parameters is undefined such that the one or more undefined parameters prevent the robotic system from executing a corresponding subtask;

determining an arrangement of the two or more subtasks to perform the given task, wherein the arrangement includes a combination of the two or more subtasks in a particular order;

based on the determined arrangement of the two or more subtasks, (i) determining an arrangement of the two or more peripherals on the modular reconfigurable workcell to perform the given task, and (ii) providing for display a visual representation of each of the two or more subtasks in the particular order simultaneously on an interface of the computing device, wherein the visual representation includes an indication of the one or more undefined parameters for the given task;

receiving, via the interface of the computing device, an input defining the one or more undefined parameters for the given task, wherein a defined parameter includes information required for the robotic system to execute the given subtask; and executing the two or more subtasks in the determined arrangement and in accordance with the one or more defined parameters to cause the two or more peripherals of the robotic system to perform the given task.

2. The method of claim 1, wherein the two or more peripherals include two or more of a robot arm, a camera, a gripper, a seven degree of freedom (DOF) arm with a camera, a device for assessing device-under-test functionality, a sensor for measuring a location of a device-under-test, and an input/output (I/O) peripheral for interfacing to an external device.

3. The method of claim 1, wherein the one or more parameters include one or more of a location of a given peripheral of the two or more peripherals, an orientation of a component of the given peripheral, a force limit for a component of the given peripheral, a rotation speed of a component of the given peripheral, a pattern for the given peripheral to follow, and a count of a number of times the given subtask is performed.

4. The method of claim 1, wherein the input defining the one or more undefined parameters comprises moving a component of the robotic system to define a geometrical bound for the component.

5. The method of claim 1, wherein at least one of the one or more parameters are initially defined by a default setting, wherein the default setting is based at least in part by sensor data from one or more sensors of the robotic system.

6. The method of claim 1, wherein the two or more subtasks include one or more error conditions, wherein an occurrence of one of the one or more error conditions cause the robotic system to stop performing the given task and provide for display an error message on the interface of the computing device.

7. The method of claim 1, wherein respective modular docking bays include a plurality of electrical connections for a variety of power and communication busses of the two or more docking modules to be attached, and wherein the two or more docking modules provide an electrical and mechanical interface between a respective peripheral and the workcell.

8. The method of claim 7, wherein the two or more modular docking bays couple to the two or more docking modules through the plurality of electrical connections and via a printed circuit board (PCB) card edge connector or a wire harness.

9. A computing device, comprising:
one or more processors; and
a non-transitory computer-readable medium, configured to store instructions, that when executed by the one or more processors, cause the computing device to perform functions comprising:
receiving a request for a given task to be performed by a robotic system, wherein the robotic system includes a modular reconfigurable workcell including two or more modular docking bays on a surface of the workcell that support attachment of two or more docking modules in a fixed geometric configuration;
determining two or more subtasks required to perform the given task, wherein the two or more subtasks are performed by two or more peripherals attached to the two or more docking modules of the robotic system, wherein a first peripheral of the two or more peripherals is configured to perform a first set of subtasks and a second peripheral of the two or more peripherals is configured to perform a second set of subtasks, wherein the two or more subtasks include one or more parameters used to define the two or more subtasks, wherein the one or more parameters include information required for the robotic system to execute a given subtask, and wherein at least one of the one or more parameters is undefined such that the one or more undefined parameters prevent the robotic system from executing a corresponding subtask;
determining an arrangement of the two or more subtasks to perform the given task, wherein the arrangement includes a combination of the two or more subtasks in a particular order;
based on the determined arrangement of the two or more subtasks, (i) determining an arrangement of the two or more peripherals on the modular reconfigurable workcell to perform the given task; and (ii) providing for display a visual representation of each of the two or more subtasks in the particular order simultaneously on an interface of the computing device, wherein the visual representation includes an indication of the one or more undefined parameters for the given task;
receiving, via the interface of the computing device, an input defining the one or more undefined parameters for the given task, wherein a defined parameter includes information required for the robotic system to execute the given subtask; and
executing the two or more subtasks in the determined arrangement and in accordance with the one or more defined parameters to cause the two or more peripherals of the robotic system to perform the given task.

10. The computing device of claim 9, wherein the two or more peripherals include two or more of a robot arm, a camera, a gripper, a seven degree of freedom (DOF) arm with a camera, a device for assessing device-under-test functionality, a sensor for measuring a location of a device-under-test, and an input/output (I/O) peripheral for interfacing to an external device.

11. The computing device of claim 9, wherein the input defining the one or more undefined parameters comprises moving a component of the robotic system to define a geometrical bound for the component.

12. A robotic system, comprising:
a modular reconfigurable workcell including two or more modular docking bays on a surface of the workcell that support attachment of two or more docking modules in a fixed geometric configuration;
a computer-based controller in communication with the modular reconfigurable workcell, wherein the computer-based controller is configured to:
receive a request for a given task to be performed by two or more peripherals attached to the two or more docking modules of the modular reconfigurable workcell;
determine two or more subtasks required to perform the given task, wherein the two or more subtasks are performed by two or more peripherals attached to the two or more docking modules of the robotic system, wherein a first peripheral of the two or more peripherals is configured to perform a first set of subtasks and a second peripheral of the two or more peripherals is configured to perform a second set of subtasks, wherein the two or more subtasks include one or more parameters used to define the two or more subtasks, wherein the one or more parameters include information required for the robotic system to execute a given subtask, and wherein at least one of the one or more parameters is undefined such that the one or more undefined parameters prevent the robotic system from executing a corresponding subtask;
determine an arrangement of the two or more subtasks to perform the given task, wherein the arrangement includes a combination of the two or more subtasks in a particular order;
based on the determined arrangement of the two or more subtasks, (i) determine an arrangement of the two or more peripherals on the modular reconfigurable workcell to perform the given task; and (ii) provide for display a visual representation of each of the two or more subtasks in the particular order simultaneously on an interface of the computer-based controller, wherein the visual representation includes an indication of the one or more undefined parameters for the given task;
receive, via the interface of the computer-based controller, an input defining the one or more undefined parameters for the given task, wherein a defined parameter includes information required for the robotic system to execute the given subtask; and
execute the two or more subtasks in the determined arrangement and in accordance with the one or more defined parameters to cause the two or more peripherals of the modular reconfigurable workcell to perform the given task.

13. The robotic system of claim 12, wherein respective modular docking bays include a plurality of electrical connections for a variety of power and communication busses of the two or more docking modules to be attached, and wherein the two or more docking modules provide an electrical and mechanical interface between a respective peripheral and the workcell.

14. The robotic system of claim 13, wherein the plurality of electrical connections include Ethernet and USB connections.

15. The robotic system of claim 12, wherein the two or more peripherals include two or more of a robot arm, a camera, a gripper, a seven degree of freedom (DOF) arm with a camera, a device for assessing device-under-test functionality, a sensor for measuring a location of a device-under-test, and an input/output (I/O) peripheral for interfacing to an external device.

\* \* \* \* \*